(12) United States Patent
Aasheim et al.

(10) Patent No.: US 12,367,676 B2
(45) Date of Patent: Jul. 22, 2025

(54) SYSTEM AND METHOD FOR GEOLOCATING PLAYERS ON THE FIELD OF PLAY WITHIN VIDEO OF AMERICAN FOOTBALL

(71) Applicants: Jered Donald Aasheim, Eugene, OR (US); Ethan John Aasheim, Eugene, OR (US)

(72) Inventors: Jered Donald Aasheim, Eugene, OR (US); Ethan John Aasheim, Eugene, OR (US)

(73) Assignee: Jered Donald Aasheim, Eugene, OR (US)

( * ) Notice: Subject to any disclaimer, the term of this patent is extended or adjusted under 35 U.S.C. 154(b) by 385 days.

(21) Appl. No.: 18/079,275

(22) Filed: Dec. 12, 2022

(65) Prior Publication Data

US 2023/0215172 A1 Jul. 6, 2023

Related U.S. Application Data

(60) Provisional application No. 63/295,871, filed on Jan. 1, 2022.

(51) Int. Cl.
*G06V 20/40* (2022.01)
*G06T 7/73* (2017.01)
(Continued)

(52) U.S. Cl.
CPC ............... *G06V 20/42* (2022.01); *G06T 7/73* (2017.01); *G06T 11/203* (2013.01);
(Continued)

(58) Field of Classification Search
CPC ........ G06V 20/42; G06V 10/774; G06V 10/82; G06V 20/70; G06V 40/10; G06V 20/20;
(Continued)

(56) References Cited

U.S. PATENT DOCUMENTS 11,468,578 B2 * 10/2022 Nie ..................... G06F 18/214
2021/0133482 A1 * 5/2021 Kohler ................. G06V 20/00
2022/0084222 A1 * 3/2022 Nie ..................... G06F 18/214

OTHER PUBLICATIONS

Nie, X., Chen, S., & Hamid, R. (2021). A Robust and Efficient Framework for Sports-Field Registration. https://openaccess.thecvf.com/content/WACV2021/papers/Nie_A_Robust_and_Efficient_Framework_for_Sports-Field_Registration_WACV_2021_paper.pdf (Year: 2021).*

(Continued)

*Primary Examiner* — Gregory A Morse
*Assistant Examiner* — David Alexander Wambst

(57) ABSTRACT

Systems and methods for constructing a grid model within video are disclosed. Exemplary implementations may: overlay one or more field line, hashmark line, or sideline on one or more frame of video; construct a plurality of evenly spaced longitudinal lines parallel to the one or more field line; detect, using a neural network model, one or more field object in the one or more fame of video; construct one or more anchor line along a top portion of a detected field object; construct a plurality of evenly spaced latitudinal lines parallel to the one or more hashmark line or the one or more anchor line; and overlay the plurality of evenly spaced longitudinal lines, the one or more anchor line, or the plurality of evenly spaced latitudinal lines on the one or more frame of video.

14 Claims, 15 Drawing Sheets

(51) Int. Cl.
*G06T 11/20* (2006.01)
*G06V 10/774* (2022.01)
*G06V 10/82* (2022.01)
*G06V 20/70* (2022.01)
*G06V 40/10* (2022.01)

(52) U.S. Cl.
CPC ............ *G06V 10/774* (2022.01); *G06V 10/82* (2022.01); *G06V 20/70* (2022.01); *G06V 40/10* (2022.01); *G06T 2207/10016* (2013.01); *G06T 2207/20081* (2013.01); *G06T 2207/20084* (2013.01); *G06T 2207/30196* (2013.01); *G06T 2207/30228* (2013.01)

(58) Field of Classification Search
CPC ............. G06T 2207/30228; G06T 7/73; G06T 11/203; G06T 2207/10016; G06T 2207/20081; G06T 2207/20084; G06T 2207/30196
See application file for complete search history.

(56) References Cited

OTHER PUBLICATIONS

Xu, H., Lu, J., He, Q., Gu, L., & Feng, C. (2020). Research on Detecting Moving Objects in Football Match Video. Journal of Physics: Conference Series, 1651(1), 012161. https://doi.org/10.1088/1742-6596/1651/1/012161 (Year: 2020).*

Lee, T. (2014). Automating NFL Film Study: Using Computer Vision to Analyze All-22 NFL Film. https://cvgl.stanford.edu/teaching/cs231a_winter1415/prev/projects/LeeTimothy.pdf (Year: 2014).*

Jiang, W., Camilo, J., Higuera, G., Angles, B., Sun, W., Javan, M., & Moo, K. (2020). Optimizing Through Learned Errors for Accurate Sports Field Registration. (Year: 2020).*

Shuhei Tarashima. (2020). SFLNet: Direct Sports Field Localization via CNN-Based Regression. Lecture Notes in Computer Science, 677-690. https://doi.org/10.1007/978-3-030-41404-7_48 (Year: 2020).*

Jacquelin, N., Vuillemot, R., & Duffner, S. (2022). Efficient One-Shot Sports Field Image Registration with Arbitrary Keypoint Segmentation. 2022 IEEE International Conference on Image Processing (ICIP). https://doi.org/10.1109/icip46576.2022.9897170 (Year: 2022).*

API Football. (2021, June 9). API-Football—Documentation. API-Football. https://www.api-football.com/documentation-v3#section/Changelog Relevant pages (Year: 2021).*

S. Falaleev, N., & Chen, R. (Oct. 9, 2024,). Enhancing Soccer Camera Calibration Through Keypoint Exploitation. Arxiv.org. https://arxiv.org/html/2410.07401v1#bib.bib11 (Year: 2024).*

Berjón, D., Cuevas, C., & García, N. (2023). Soccer line mark segmentation and classification with stochastic watershed transform. Signal Processing: Image Communication, 118, 117014. https://doi.org/10.1016/j.image.2023.117014 (Year: 2023).*

\* cited by examiner

SYSTEM AND METHOD FOR GEOLOCATING PLAYERS ON THE FIELD OF PLAY WITHIN VIDEO OF AMERICAN FOOTBALL

This application claims priority to and the benefit of U.S. Provisional Application Ser. No. 63/295,871, entitled "SYSTEM AND METHOD FOR GEOLOCATING PLAYERS ON THE FIELD OF PLAY WITHIN VIDEO OF AMERICAN FOOTBALL", field Jan. 1, 2022, which is hereby incorporated by reference in its entirety.

FIELD OF THE INVENTION

This invention relates to video analysis for the sport of American football (as opposed international football which is also commonly referred to within the United States as "soccer"). Particularly, this invention relates to the analysis of video footage of American football to geolocate the players on the field of play directly from the captured video. More particularly, the invention relates to a method and system for using field lines identified within the input video combined with deep learning techniques to construct a model of the player locations on the field. Specifically, the invention relates to a novel technique for employing deep learning models to identify existing field objects and then using the predefined geometrical relationships of these field markings in relationship to the identified field lines to generate an accurate model of the x-y coordinate system for the actual field of play vs. the coordinate system used by the camera that captured the original video. The resulting constructed "grid model" of the field can then be overlayed on to the input video to accurately geolocate the absolute positions of the players on the field of play. This invention is applicable to any type of field of play used in American football whether this be at the high school, college (e.g., NCAA), or professional level of competition (e.g., NFL, CFL, European football, etc.).

BACKGROUND OF THE INVENTION

American football is often described as "a game of inches" because of the importance of the location of the ball during course of the game. Teams strategize and create game plans for how their offenses can best move the ball the length of the field of play into the "end zone" and score points or how to defensively stop their opponent from doing the same. The relatively few numbers of plays in a game (~100 plays is common) results in the margin for error also being relatively low which increases the importance of game planning and preparation.

To create these game plans and strategies, recorded video of opponent play is often analyzed by human experts knowledgeable of the subject matter—specifically coaches—who watch the footage and manually annotate events within the video. Example annotations include the positions and alignments of the Offensive players before the MOS (commonly referred to as the "formation"), whether players moved from one location to another before the MOS (commonly referred to as "motion"), how quickly an Offensive team starts the play after they are in formation, etc. This method of annotating video is time consuming and error prone as many of the observations are subject to human judgment. For example, the determination for whether the Offense is operating a "hurry up" strategy is subject to the observer's opinion: one person may state the Offense is running hurry up whereas another person may decide this isn't the case. Even if "hurry up" is quantified as the MOS being less than 10 seconds from the start of the play clock start, the frame number in the video for when the MOS occurred is relegated to the annotator to decide. Without a consistent process for identifying the MOS, these judgments are entirely yielded to the human annotator which introduces undesirable variation in the captured data and the follow-on analytics derived from these assembled datasets.

Another key challenge affecting video annotation is variation within the video itself. Football play is captured with differing levels of video quality, from different vantage points and angles, under a range of lighting conditions, with a wide range of range of zooming and panning, etc. As a result, even when human subjectivity is minimized (i.e., having the same person annotate multiple videos) this variation across video footage can affect the consistency of the annotations.

It is apparent that a need exists for a technique that can eliminate the inconsistency in annotating football video, that is robust to the variation introduced during video capture, and resilient to the error introduced from human subjectivity. The present invention is directed toward providing such a technique.

It is an object of the present invention to provide a method and system for automatically capturing annotations from video of American football. It is also an object of the present invention to deliver robustness against the aforementioned video quality variations which affect the quality of the captured annotations. Another object of the present invention is to eliminate human subjectivity that is typically introduced when capturing these annotations. Still a further object of the present invention is to provide a system for capturing these annotations in a fully automated and scalable manner which does not rely upon human effort, thereby saving labor, time, and ultimately cost. These and other objects of the invention will be apparent to those skilled in the art from the description that follows.

SUMMARY

The method and the system of this invention center around the innovative concept of using field lines identified within the input video in combination with deep learning techniques to construct a model of the player locations on the field of play. An American football field uses a standard set of field markings for facilitating game play with the key field markings being solid field lines traversing the width of the field, hashmarks in the middle of the field and along the sidelines the entire length of the field, and field numbers which mark absolute locations on the field of play and are associated with solid field lines. Moreover, it is common for the field to also contain logos and other markings from sponsors, the associated league or conference, etc. These additional markings do not affect the game play.

When football play is captured in video, the players on the field are transformed from their 3D space on the field of play into the 2D space used by the camera. The resulting footage is helpful for human experts to use for review and annotation but the loss of location information in the field→(to) camera transformation leaves decisions for how far an object is from some reference point entirely subjective to the human annotator's judgment. Ideally, there needs to be a mechanism for reverse transforming an object's location within the input video back to its actual absolute location on the field of play.

The present invention uses the field markings and their predefined geometrical relationships to the identified field lines within the input video to generate an accurate model of the x-y coordinate system for the actual field of play. The resulting "grid model" provides a high-confidence, real-time coordinate system so that objects captured in the video, such as players, can then be transformed back into their absolute positions on the field, thereby geolocating these players within the field of play. This grid model is kept in memory and reconstructed every N frames to account for the camera panning and zooming as the football play ensues. In some aspects, N=1. In some aspects, N is less than 1. This is an important consideration because the video quality varies based upon the camera equipment used, camera operator, lighting conditions, etc. so it is not sufficient to only construct the field model once—it must be repeatedly reconstructed. 2D to 3D conversions are not new to image processing and one conventional approach is to use a perspective transform to convert the captured 2D objects into a 3D space. This approach requires a 3×3 transformation matrix and specifically four "anchor" points in the captured video frame that correspond to four locations on the original field of play. This approach, however, suffers from several challenges such as difficulty identifying the candidate anchor points, skew and warping introduced by the camera, varying levels of video quality, and the transformed locations are still relative versus absolute. The proposed method addresses these shortcomings.

The present invention advances the art by using standard field markings, namely hashmarks and field numbers, in their relationship to the identified field lines to construct a grid model of the field of play. To utilize these field markings, the system must detect these objects in real-time within the video. To enable this capability, the system employs deep learning to train a neural network which can detect the hashmarks and field numbers on the field of play. Thousands of images of football fields from different camera angles, lighting conditions, perspectives, etc. were obtained and the hashmark and field number marking locations were annotated by human experts. These annotations were then used to train a neural network and produce a generalized model which can then identify these same type of field objects in unseen video footage that is processed by the system.

With the ability to detect these known field objects in the video frame, the geometrical relationships of these objects relative to the locations of the field lines on the field are utilized to reconstruct a grid for the field of play. For example, in a standard American football field there are solid field lines every five yards apart, two hashmark lines in the middle of the field at a specific distance from the sidelines, and field numbers with predefined sizes and locations from the sidelines. Further still, there are always eighteen distinct field number markings traversing the length field and every other field line bisects a pair of field numbers. Using these predefined dimensions of an American football field, the system uses the detected objects and their relationship to the identified field lines to construct a x-y coordinate system for the actual field of play. This "grid model" then provides a high-quality, real-time, reconstruction of the original x-y coordinate system for the field of play which results in a very robust way to reverse transform objects within the 2D space of the camera back to their original 3D space on the field of play. Further still, this location can be absolutely identified on the original field of play which results in a method for geolocating players. Moreover, this geolocation is not static and can be updated throughout the entire sequence of frames within the input video thereby simulating Global Positioning System (GPS) for each of the players on the field. This simulated GPS does not require the aid of any sensors or hardware—the coordinates are captured directly from the input video.

In one aspect of the disclosure, a system for constructing a grid model within video, may include one or more processor configured by machine-readable instruction. The system may be configured for overlaying one or more field line, one or more hashmark line, or one or more sideline on one or more frame of video. The system may be configured for constructing a plurality of evenly spaced longitudinal lines parallel to the one or more field line. The system may be configured for detecting, using a neural network model, one or more field object in the one or more fame of video. The system may be configured for constructing one or more anchor line along a top portion of a detected field object and constructing a plurality of evenly spaced latitudinal lines parallel to the one or more hashmark line or the one or more anchor line. The system may be configured for overlaying the plurality of evenly spaced longitudinal lines, the one or more anchor line, or the plurality of evenly spaced latitudinal lines on the one or more frame of video.

In some aspects, the one or more field line, hashmark line, or sideline may be determined using a neural network model.

In some aspects, the one or more field object may include one or more hashmark and field number.

In some aspects, the one or more processor may be further configured by machine-readable instructions for assigning the plurality of evenly spaced longitudinal lines or the plurality of evenly spaced longitudinal lines an absolute field location.

In some aspects, the one or more processor may be further configured by machine-readable instructions for determining a left boundary and a right boundary for each of the plurality of evenly spaced longitudinal lines.

In some aspects, constructing one or more anchor line along a top portion of a detected field object may include annotating a detected field object with a bounding box.

In some aspects, constructing a plurality of evenly spaced latitudinal lines parallel to the one or more hashmark line or the one or more anchor line may include determining a distance between a first hashmark line and a second hashmark line, a first sideline and a second sideline, a first hashmark line and a first sideline, a first hashmark line and a first anchor line, a first anchor line and a second anchor line, or a first sideline and a first anchor line; and dividing the distance equally.

In some aspects, the one or more processor may be further configured by machine-readable instructions for annotating the one or more frame.

In some aspects, the one or more processor may be further configured by machine-readable instructions for determining a type of field.

In some aspects, determining a type of field may include receiving an input specifying the type of field.

In some aspects, determining a type of field may include using proportional distances of field objects detected by the neural network model.

In some aspects, the one or more processor may be further configured by machine-readable instructions for determining a location where the one or more field line intercepts a top boundary of the one or more frame of video; and determining a location where the one or more field line intercepts a bottom boundary of the one or more frame of video.

In some aspects, constructing a plurality of evenly spaced longitudinal lines parallel to the one or more field line may include determining a distance between a first location where a first of the one or more field line intercepts a top boundary and a second location where a second of the one or more field lines intercepts a top boundary; and dividing the distance equally.

In some aspects, training a neural network may include annotating field markings or field objects on samples of video.

In another aspect of the disclosure, a method for converting an object in pixel space to an absolute location of a field of play may include obtaining sets of football video information. The individual ones of the sets of football video information may reflect gameplay. The method may include training a machine-learning model with the obtained sets of football video information such that the machine-learning model identifies one or more player within input video. The method may include storing the trained machine-learning model.

In some aspects, the method may include annotating a bounding box around the one or more player; and selecting an anchor point within the bounding box.

In some aspects, the anchor point may correlate to a location of feet of the one or more player.

In some aspects, training the machine-learning model may include annotating sample video.

In some aspects, the method may include locating, using a grid model, a latitudinal line and a longitudinal line nearest the anchor point.

In some aspects, the method may include determining an absolute location of the anchor point.

BRIEF DESCRIPTION OF THE DRAWINGS

A clear understanding of the key features of the invention summarized above may be had by reference to the appended drawings, which illustrate the method and system of the invention, although it will be understood that such drawings depict preferred embodiments of the invention and, therefore, are not to be considered as limiting its scope with regard to other embodiments which the invention is capable of contemplating. Accordingly.

The field of play contains a standard set of field markings.

Figure 2:
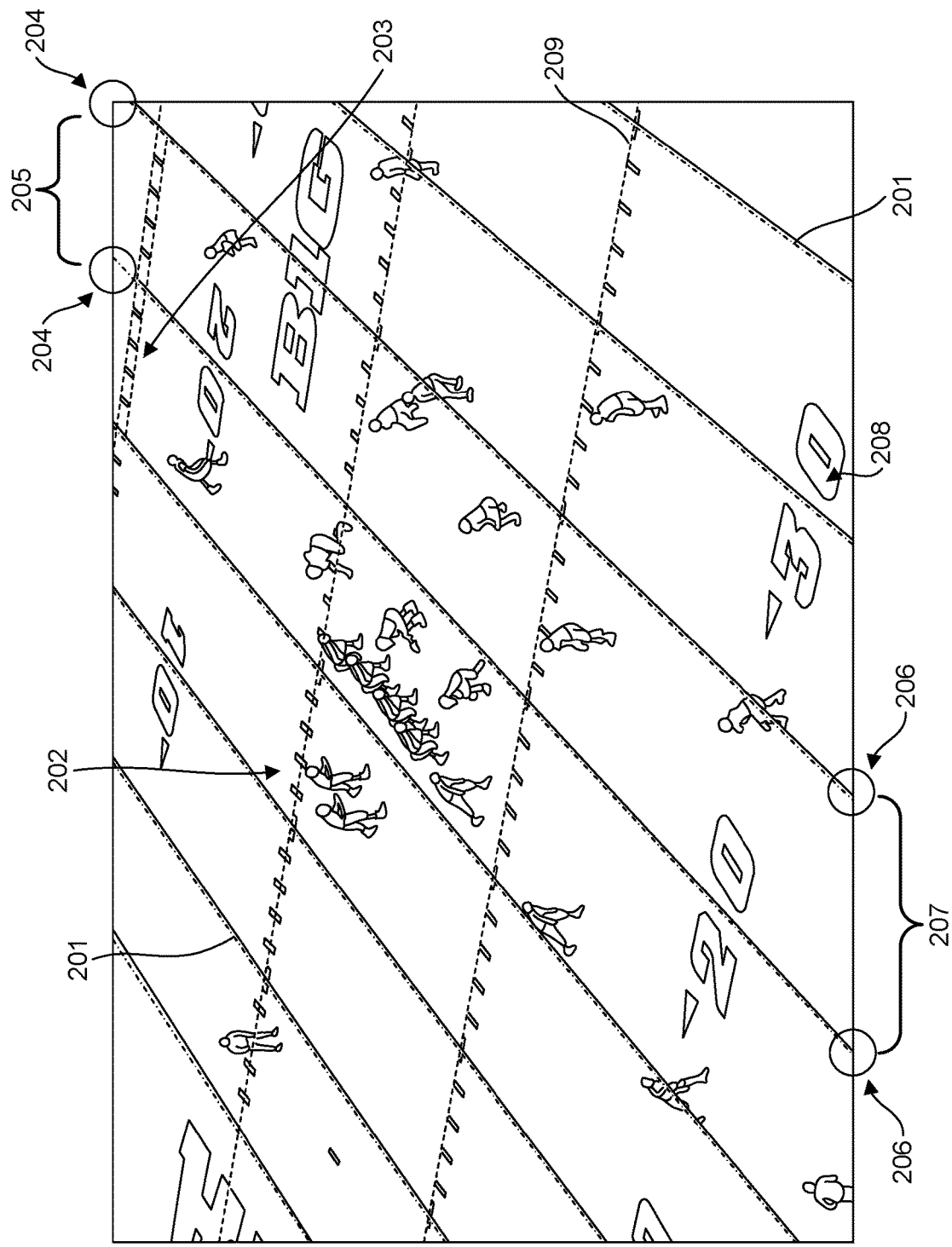

FIG. 2 presents a view of the identified field lines and hashmarks overlayed on captured video of game play on a conventional American football field.

Figure 3:
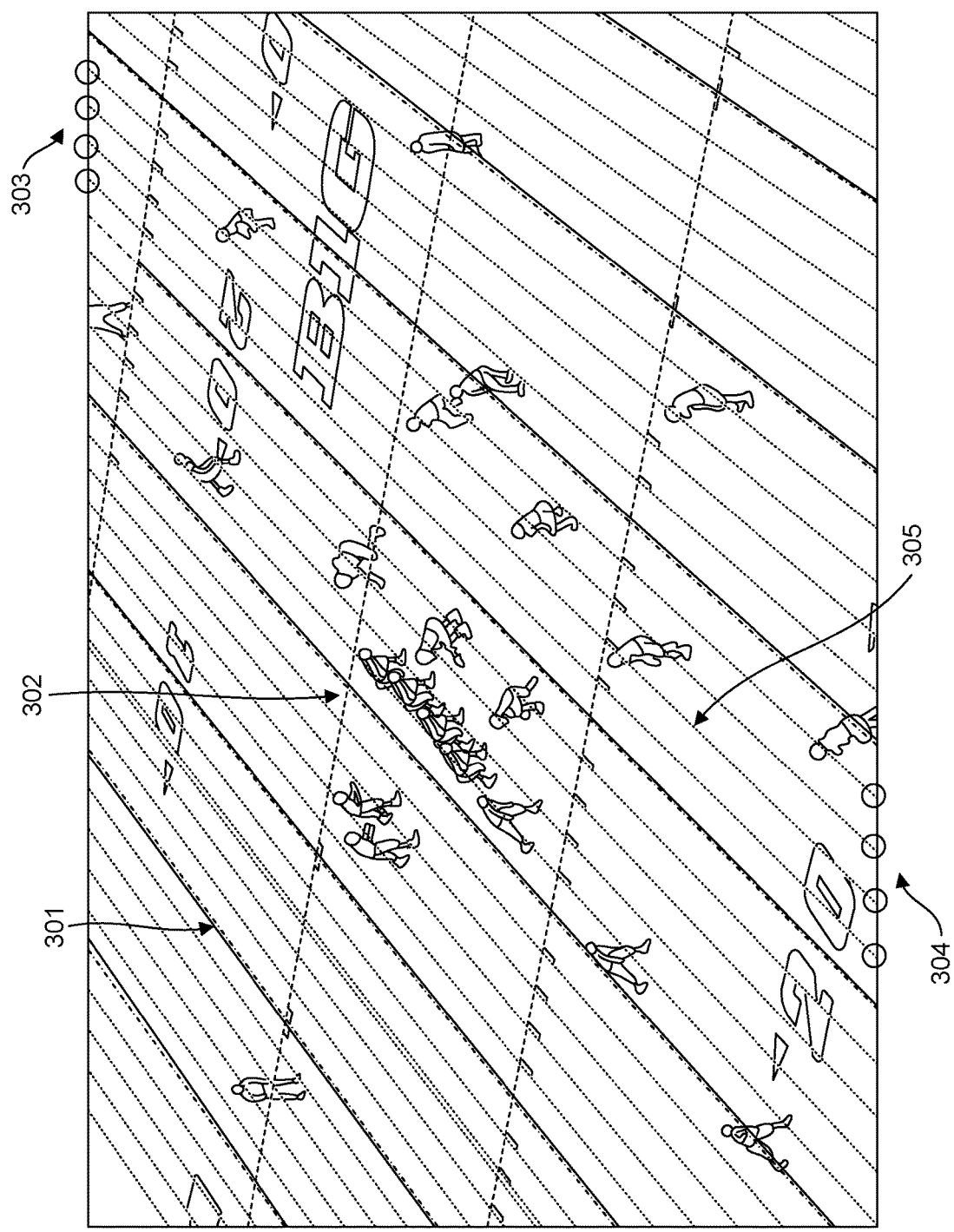

FIG. 3 is an illustration of the method and system of this invention showing constructed longitudinal field lines overlayed on captured video of game play on a conventional American football field.

Figure 4:
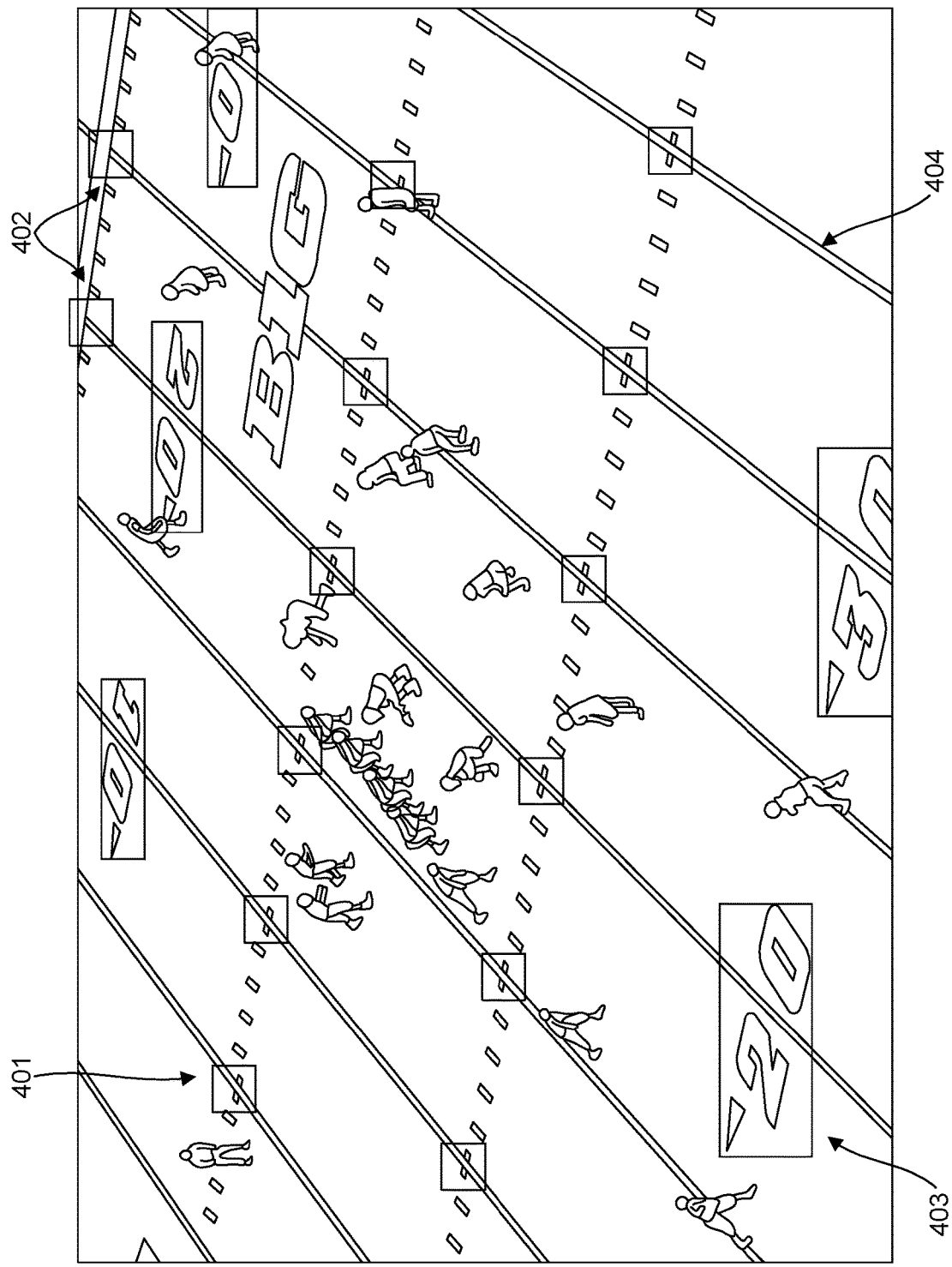

FIG. 4 presents a view of the identified field lines and hashmarks overlayed on captured video of game play on a conventional American football field.

Figure 5:
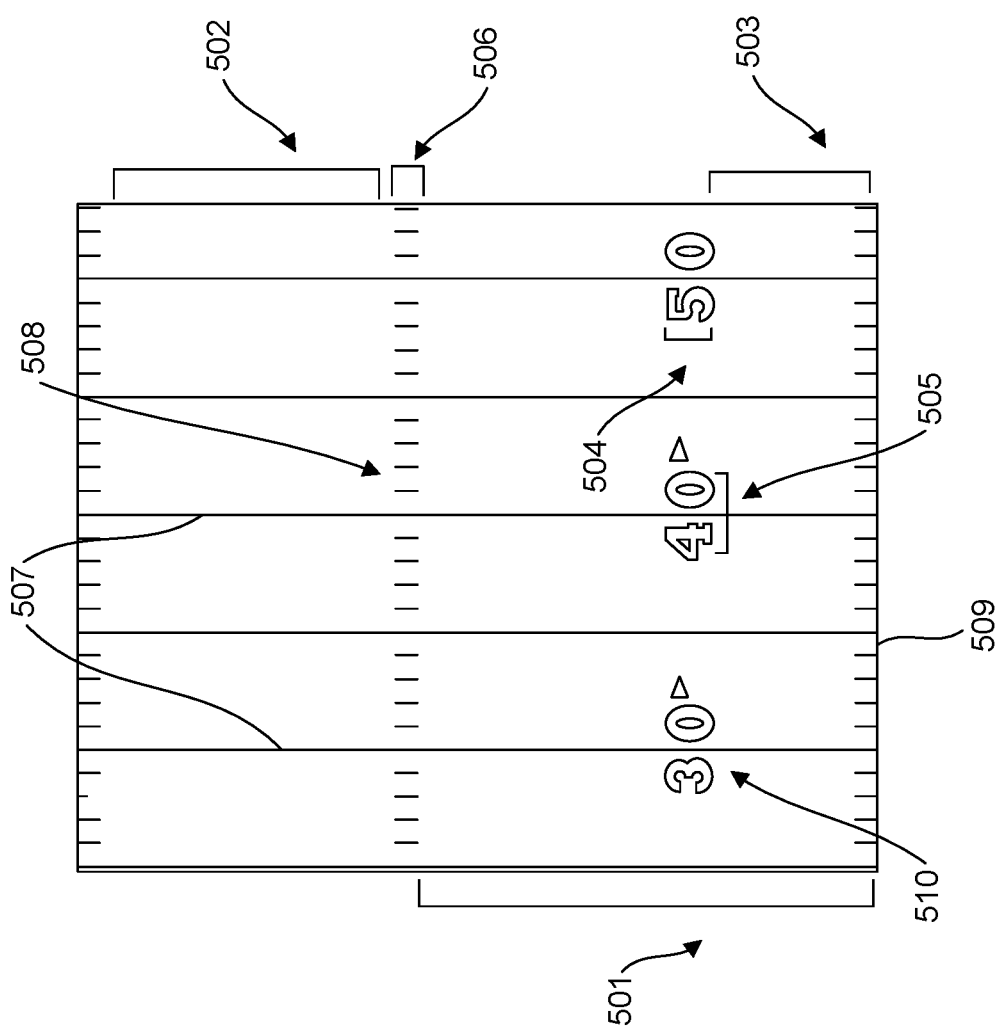

FIG. 5 presents a magnified top-view diagram of the key dimensions for field markings on a conventional American football field as well as a table listing the current dimensions for the NFL and NCAA leagues.

Figure 6:
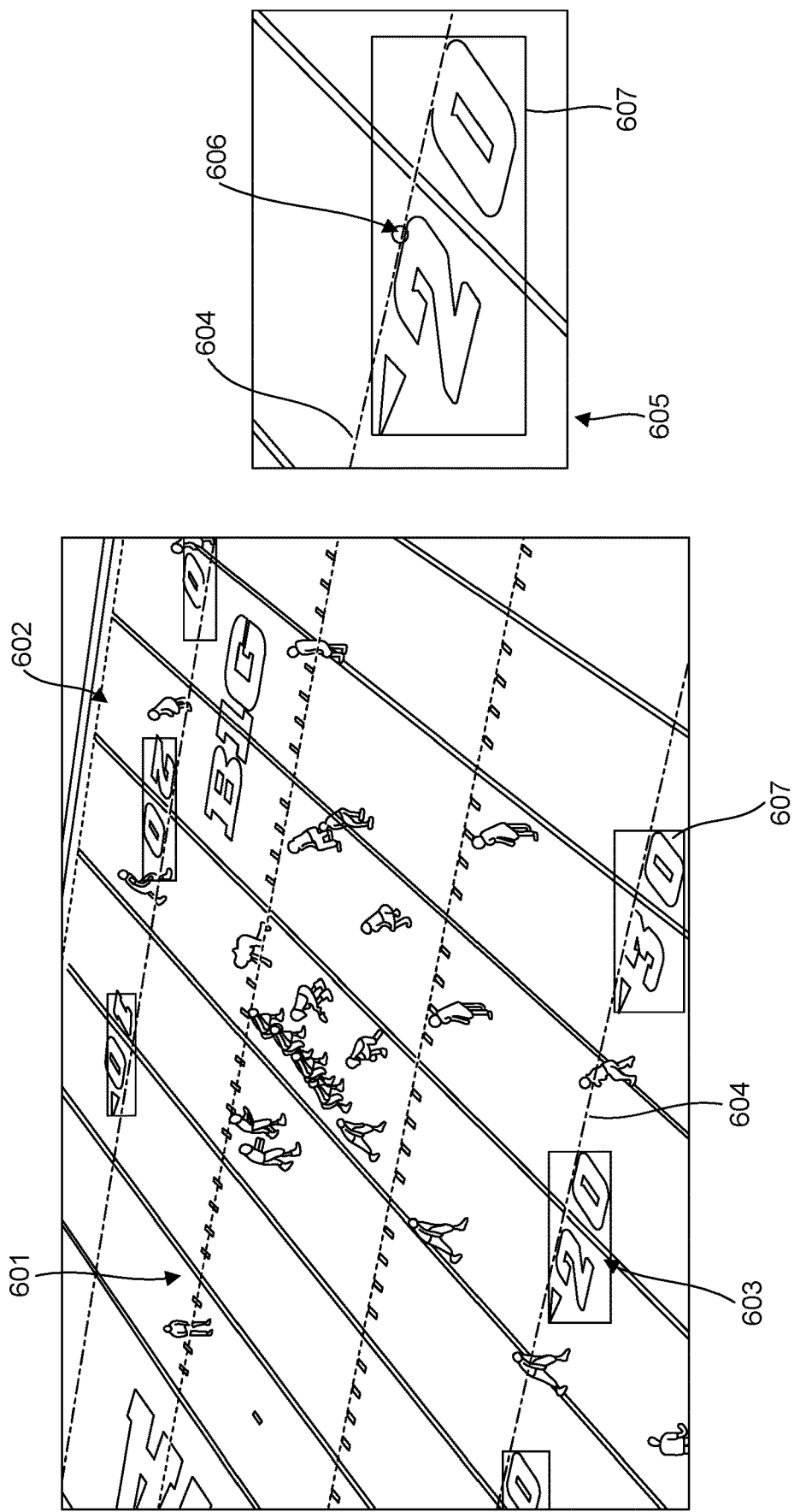

FIG. 6 is an illustration of the method and system of this invention showing constructed hashmark lines at the top of the field numbers using basic image processing and the underlying dimensions of the field of play.

Figure 7:
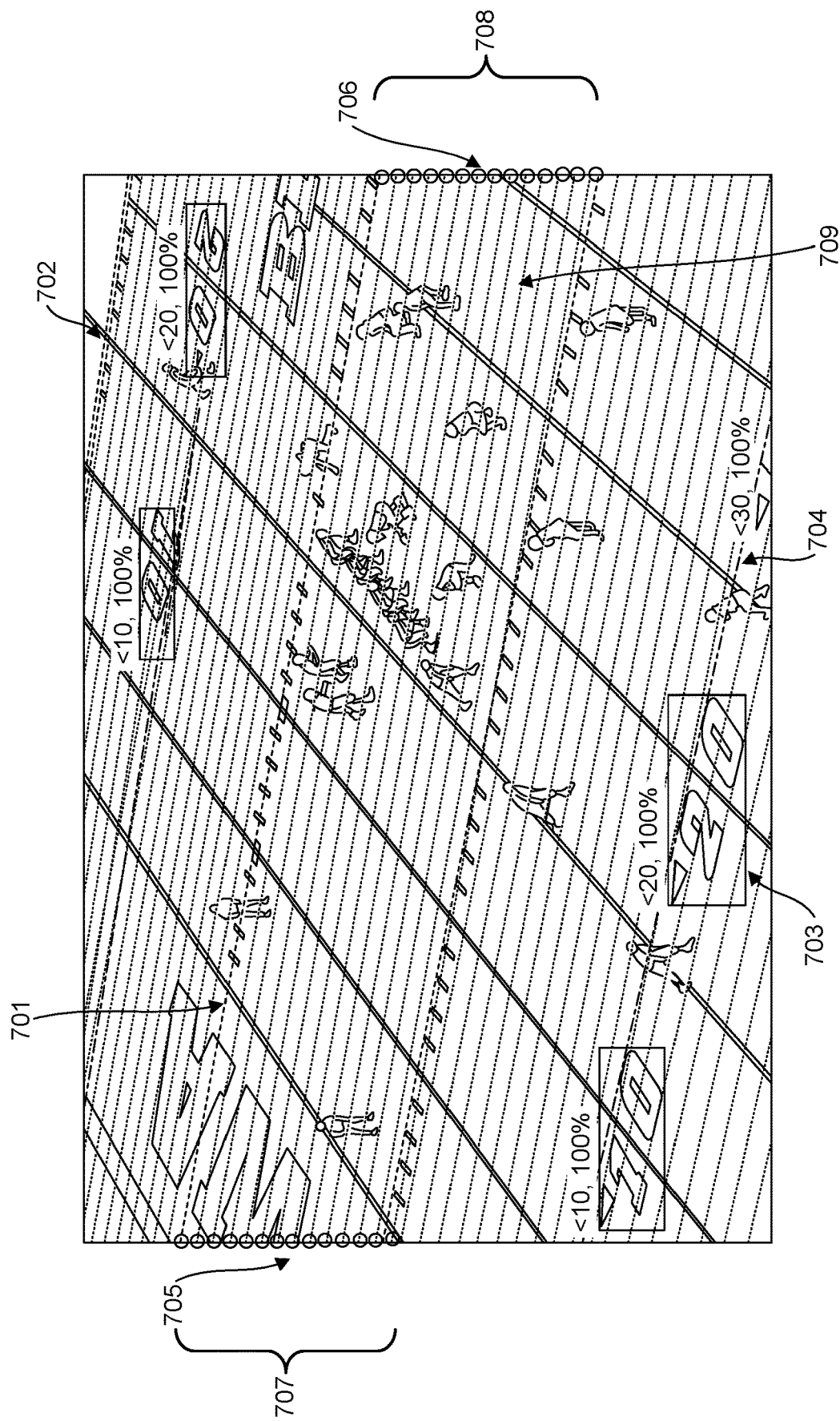

FIG. 7 is an illustration of the method and system of this invention showing constructed latitudinal field lines overlayed on captured video of game play on a conventional American football field.

Figure 8:
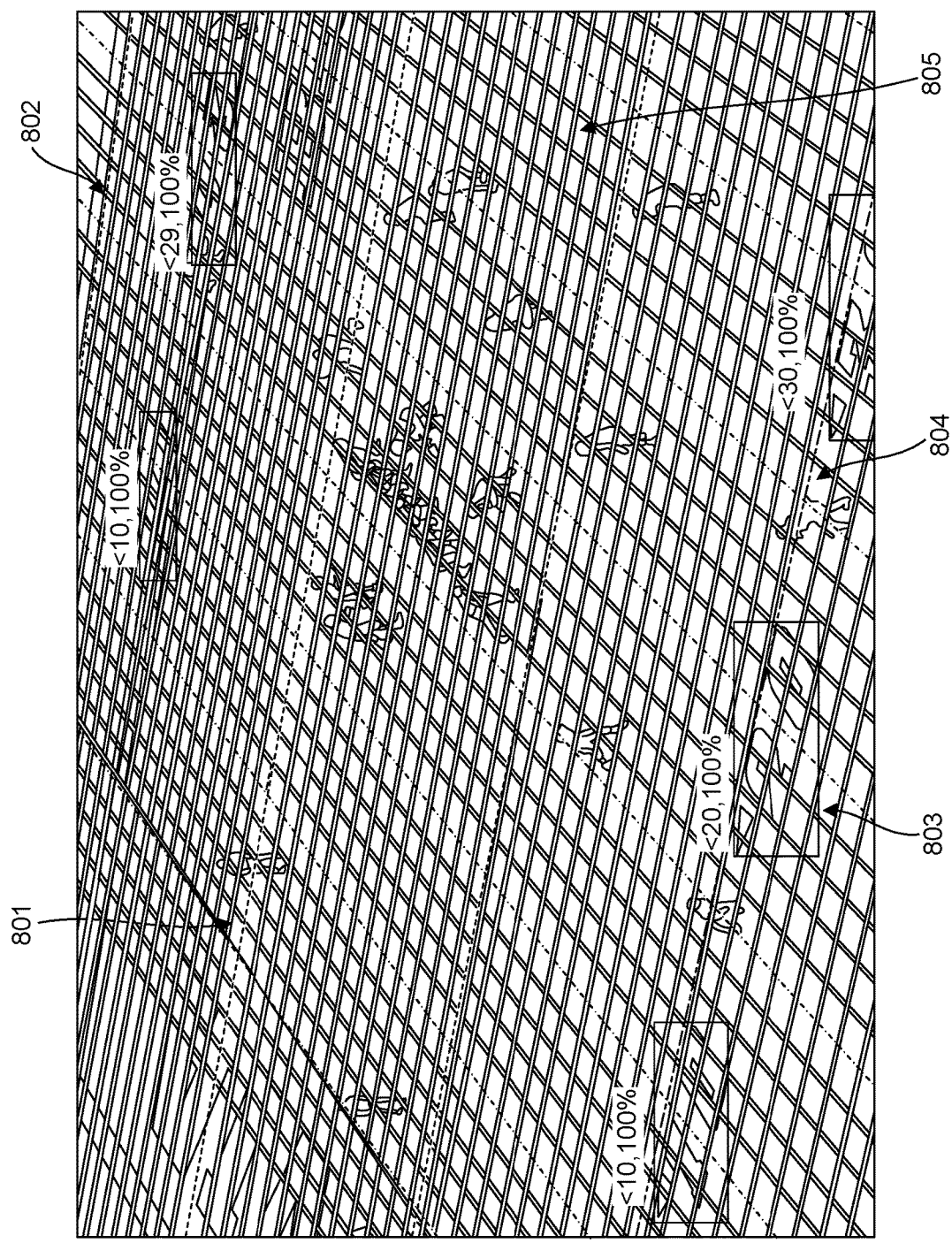

FIG. 8 is an illustration of the method and system of this invention showing the grid model's final set of constructed longitudinal and latitudinal lines overlayed on a video frame.

Figure 9:
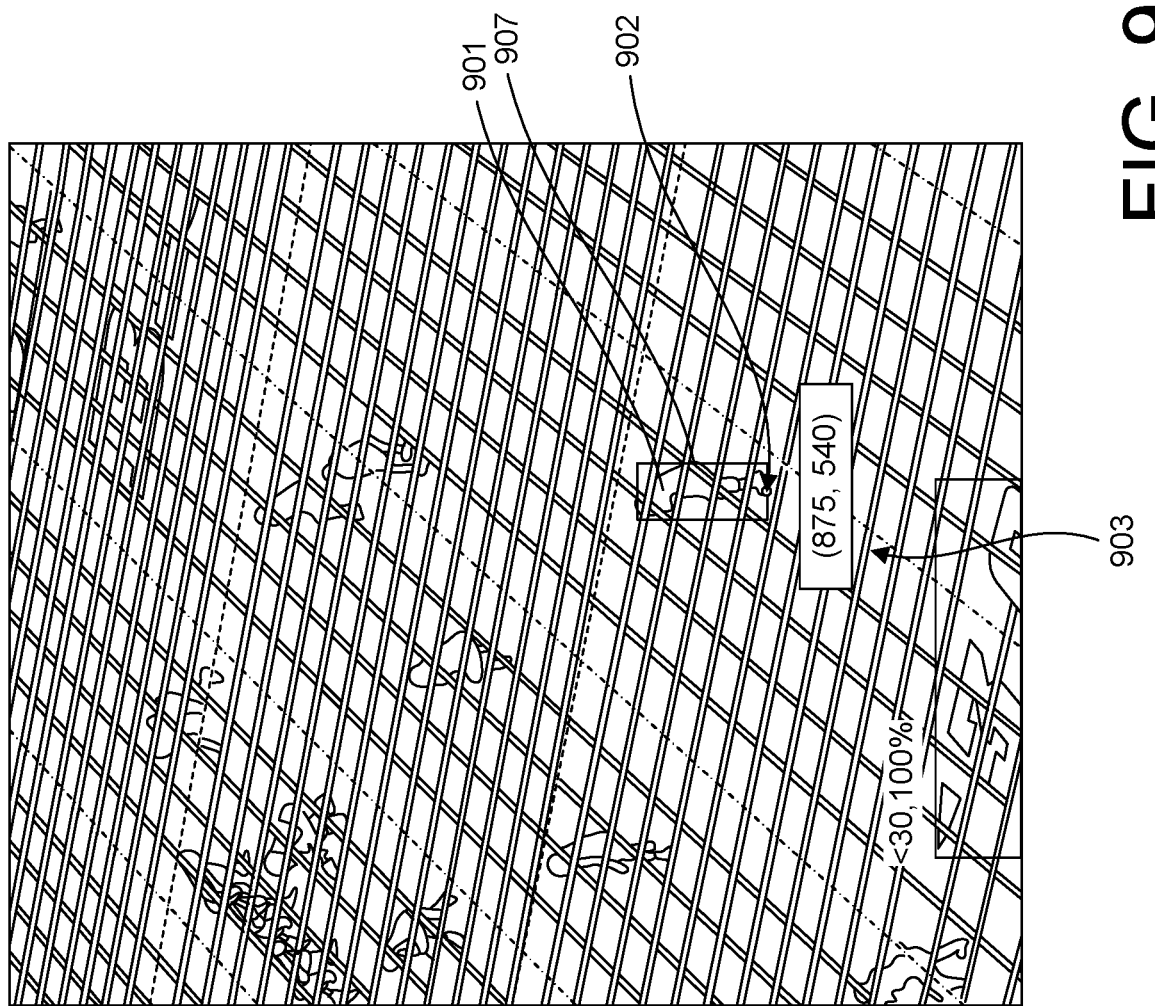

FIG. 9 is an illustration of the method and system of this invention showing an identified player in pixel space is the system will reverse transform to a geolocation the field of play.

Figure 10:
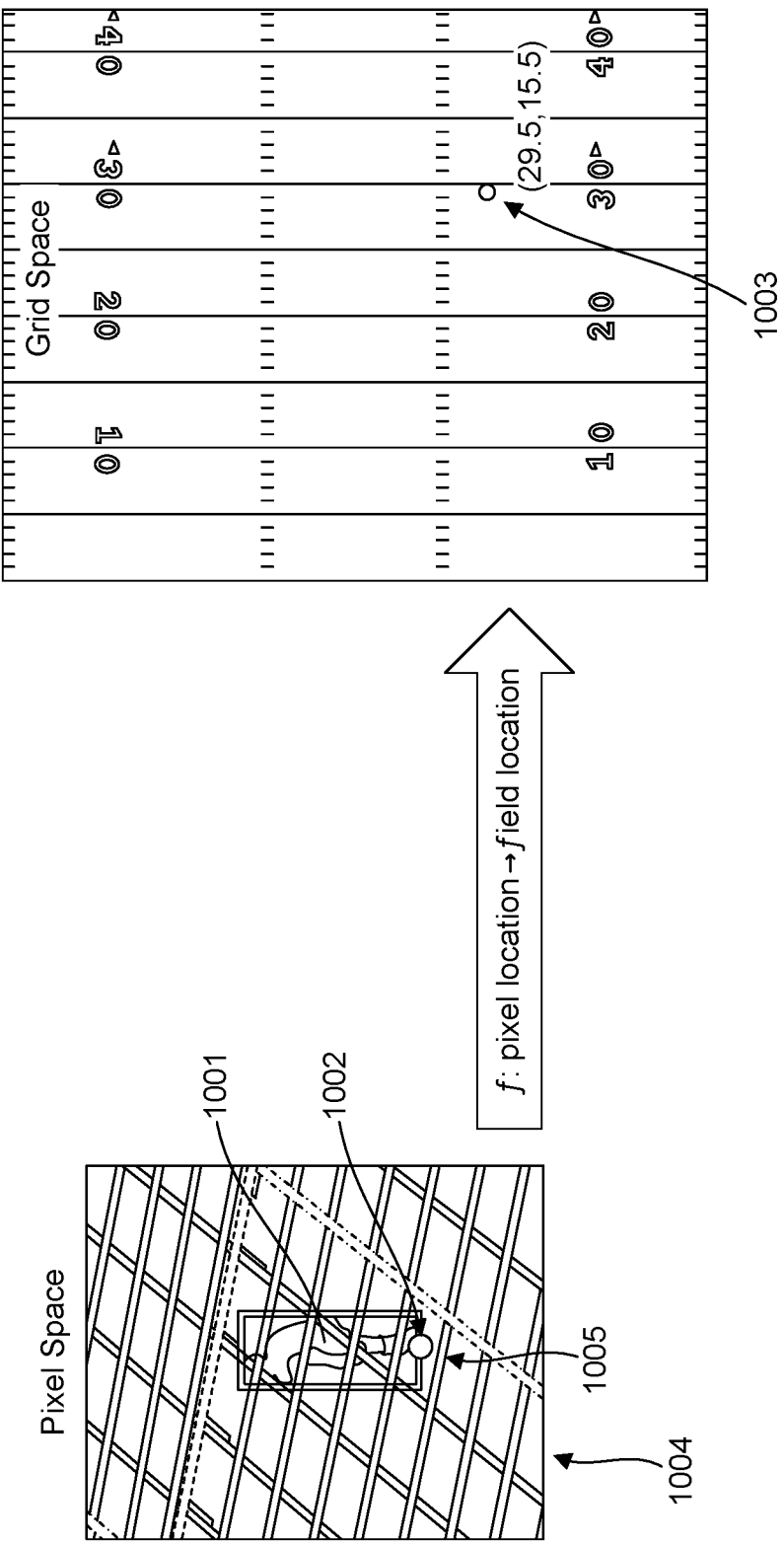

FIG. 10 is an illustration of the method and system of this invention showing a magnified view of an identified player in pixel space reverse transformed to the actual location on the field of play using the grid model.

Figure 11:
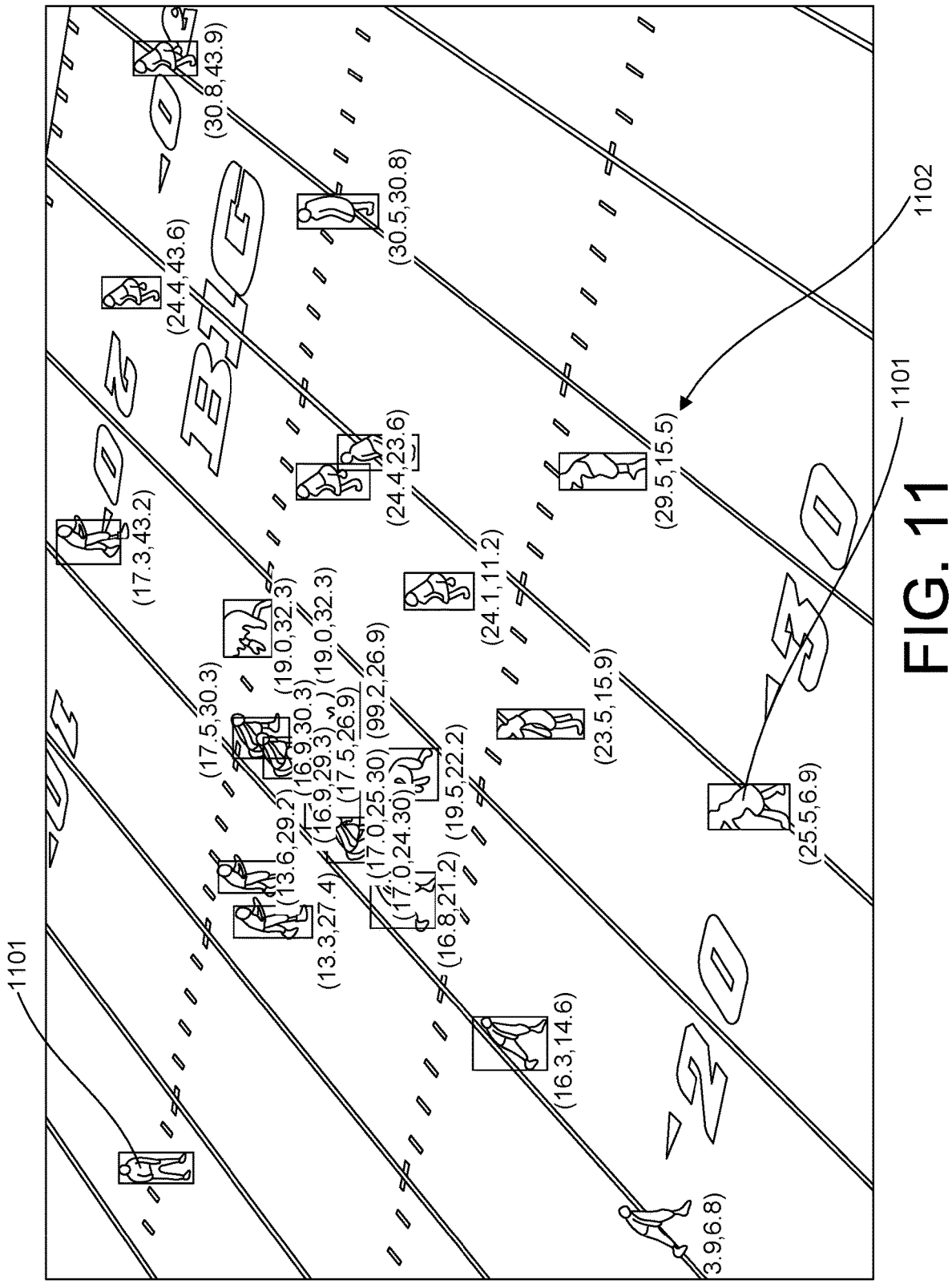

FIG. 11 is an illustration of the method and system of this invention showing the final geolocations for all identified players on the field of play.

Figure 12:
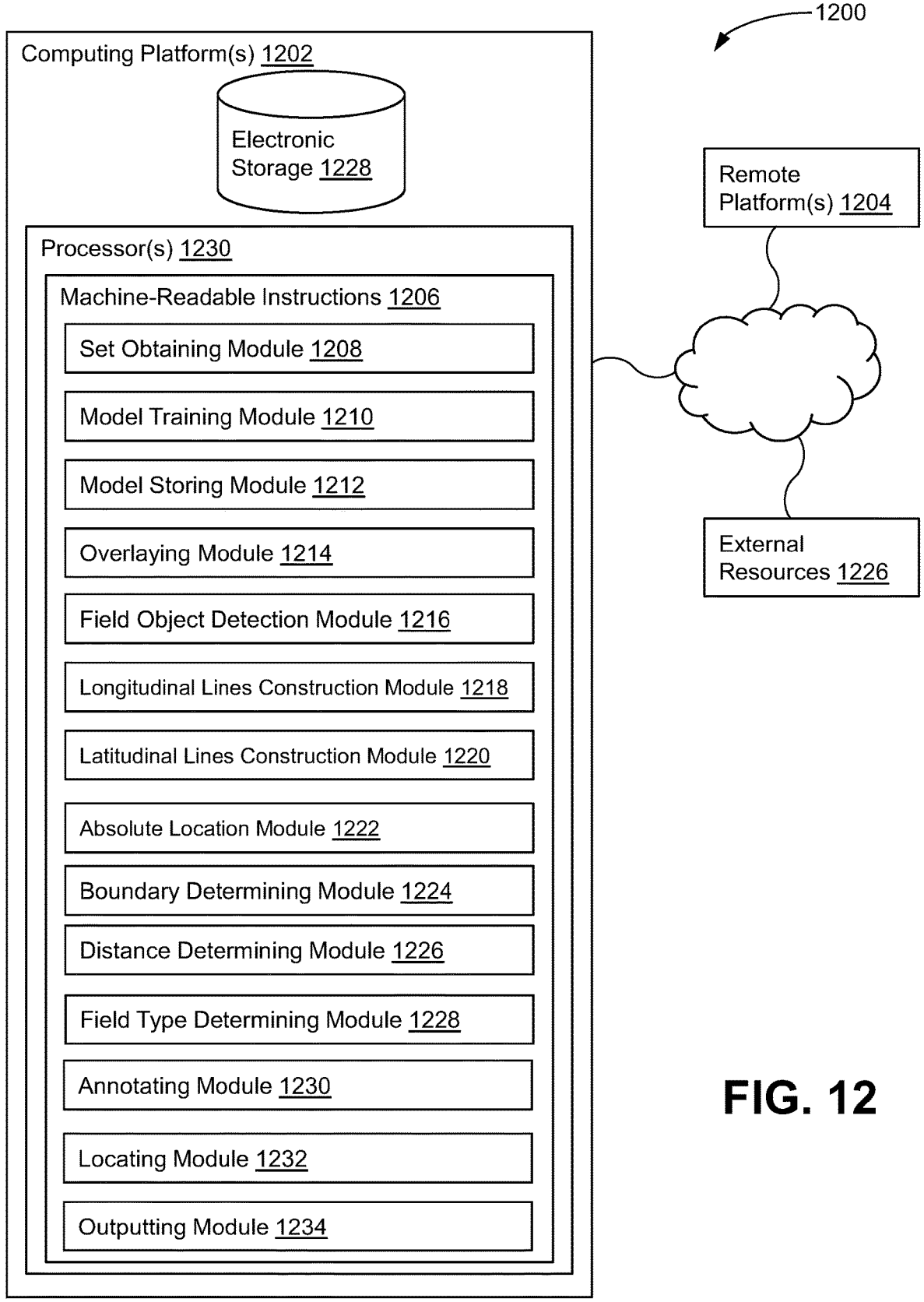

FIG. 12 illustrates a system configured for constructing a grid model within video and for converting an object in pixel space to an absolute location on a field of play, in accordance with one or more implementations.

Figure 13:
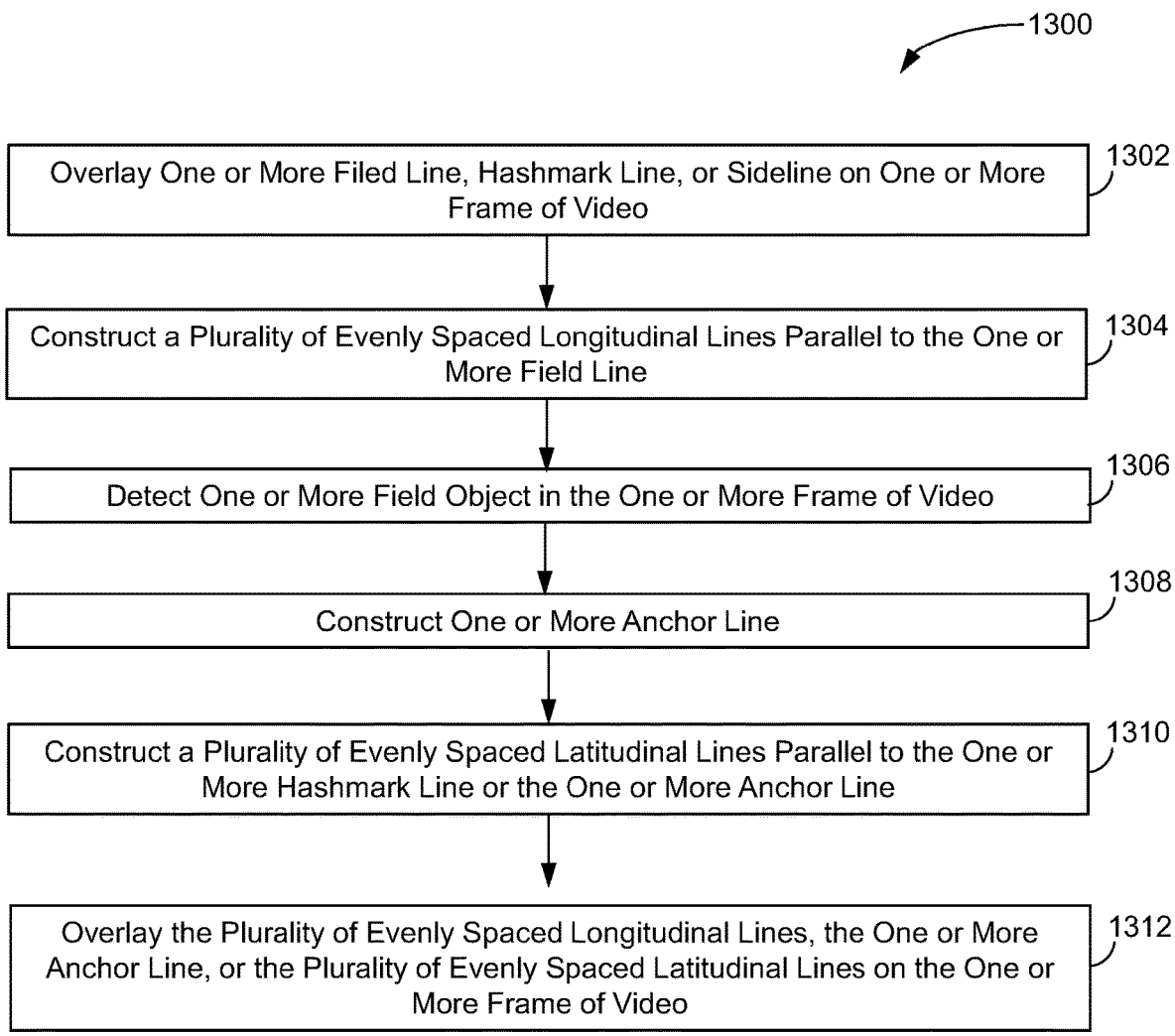

FIG. 13 illustrates a method for constructing a grid model within video, in accordance with one or more implementations.

Figure 14A:
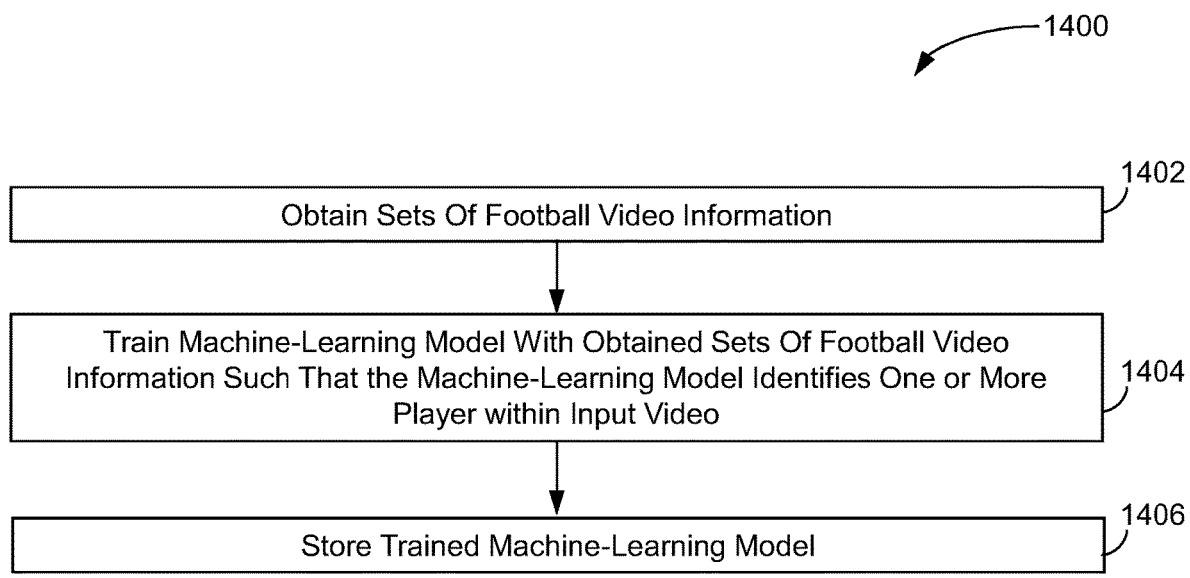
Figure 14B:
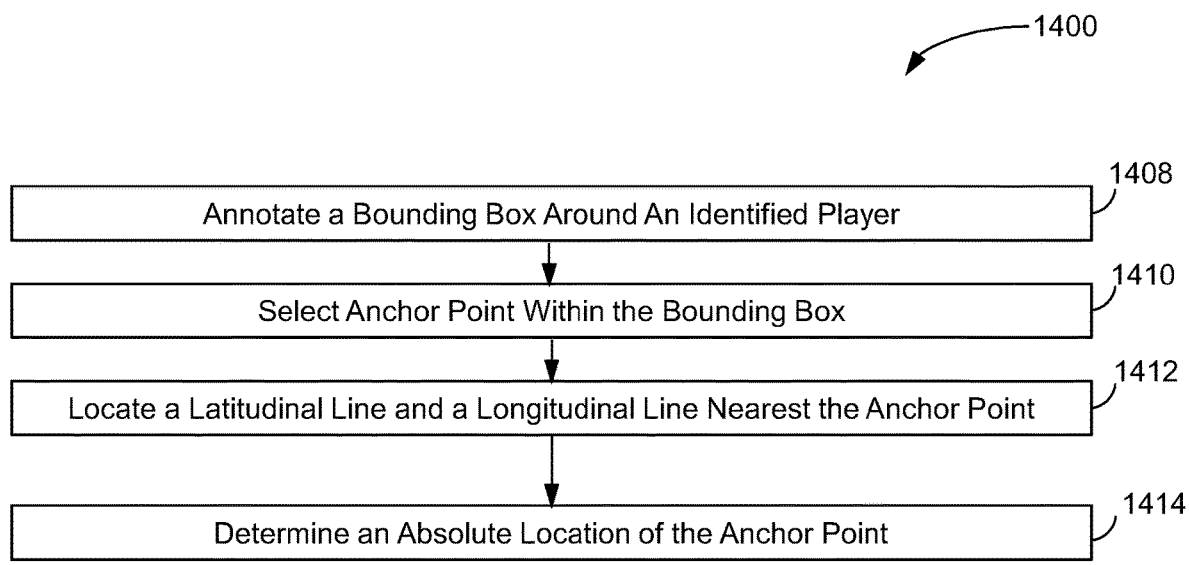

FIGS. 14A and 14B illustrate a method for converting an object in pixel space to an absolute location on a field of play, in accordance with one or more implementations.

DETAILED DESCRIPTION OF THE INVENTION

Figure 1:
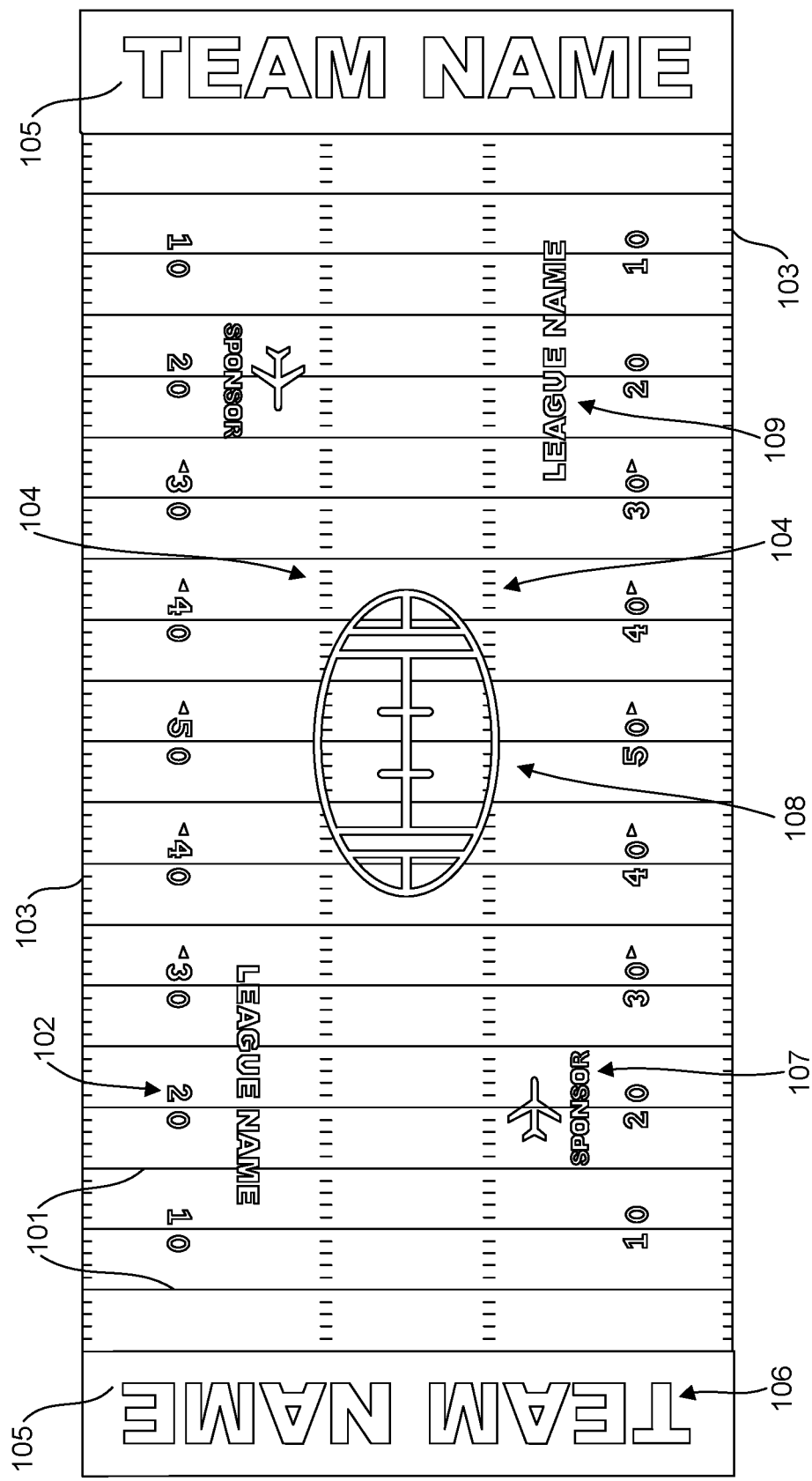
FIG. 1 presents a top-view diagram illustrating a conventional American football field.

The method and the system of this invention center around the innovative concept of using field lines identified within the input video in combination with deep learning object detection to identify existing field markings in the video and then using the predefined geometrical relationships of these objects to reconstruct an accurate model for the physical dimensions of the field of play. Referring to FIG. 1, an American football field uses a standard set of field markings for facilitating game play. The key markings on the field of play include solid field lines 101 traversing the width of the field, hashmarks 104 in the middle of the field as well as along the sidelines 103 traversing the entire length of the field, and field numbers 102 which mark absolute locations on the field of play. Further, an end zone 105 is located on both ends of the field which is used for scoring points. Moreover, it is common for the field to also contain logos 108, markings from sponsors 107, team names 106 in the end zones, and text or logos naming the associated league or conference 109, etc. These additional markings 106, 107, 108, 109 do not affect the game play and are out of scope for this invention.

The present invention requires the availability of a high-quality "field model" which reconstructs the locations of the field lines, hashmarks, and sidelines located within the original video. For an example of system and method that delivers this capability, refer to Aasheim, Jered Donald. "System and method for field line reconstruction within video of American football", Patent Application 63/295,868, Jan. 1, 2022, the contents of which are incorporated herein by reference in their entirety.

Given such a field model, FIG. 2 depicts a view for how the identified field lines and hashmarks can be overlayed on to the video. The field lines 201, hashmarks 202, and sidelines 203 from the field model are drawn on the frame of the original video. Due to the high quality of the field model, it is evident these markings align nearly perfectly with the actual markings painted on the field of play. Tight alignment of the reconstructed field lines 201, hashmarks 202, and sidelines 203 to their actual locations painted on the field of play is important and ultimately acts as a limiting factor for the precision of geolocating objects within the video as presented by this invention. Hashmarks 202 may be indicated by a hashmark line 209 that perpendicularly intersects hashmarks that are positioned between field lines 201 but shares a common axis with and overlays hashmarks that lie on the field lines 201.

The present invention advances the art by using the identified field lines 201, hashmarks 202, and sidelines 203 in combination with field markings identified by way of deep learning object detection to construct a "grid model" of the field of play. This grid model represents an x-y coordinate system for the actual field of play as opposed to the coordinate system used by the camera that captured the original video. Further, the grid model generated by the system provides in a very robust way to reverse transform objects, such as players, in the 2D space of the camera back into their 3D space on the field. Further still, the location produced by this reverse transformation can be absolutely positioned on the original the field of play, thereby simulating a Global Positioning System (GPS) which does not require the aid of any sensors or hardware attached to the players; the true x-y coordinates are captured directly from the input video.

To construct the grid model, the first step in the method is to construct the longitude lines from the field lines 201 provided by the field model. Referring to FIG. 2, the system iterates through each of the field lines 201 and calculates the location 204 where each field line 201 intercepts the top boundary of the video frame. Similarly, the system iterates through each of the field lines 201 and calculates the location 206 where each field line 201 intercepts the bottom boundary of the video frame. Note these field lines 201 and the calculated intercepts 204 and 206 are in measured pixels of the x-y coordinate system used by the camera (often called "pixel space").

Next, the system iterates through the field lines 201 and uses the intercept 204 to calculate the distance 205 in pixels to the intercept 204 of the next neighboring field line 201. The resulting distance 205 is the number of pixels between neighboring field lines 201 at the intercept point 204. Similarly, in this same iteration pass the system also calculates the distance 207 in pixels to the intercept 206 for the neighboring field line 201. Using the calculated distances 205 and 207, the system can now interpolate between the field model provided field lines 201 to construct "minor" field lines which will serve as the longitudinal lines within the grid model.

To construct the longitudinal lines, the system first decides the level of granularity to use (herein referred to as the field line step size) for each longitudinal line. The system will frequently choose a field line step size of three feet (one yard) since this is a common measurement unit in American football. Recall that from FIG. 1 that each field line 101 is fifteen feet (five yards) apart from the next field line 101. Using these predefined dimensions, the system divides this distance (fifteen feet) by the field line step size to determine how many longitudinal lines to add between each field line 201. For example, if the field line step size is set to three feet this means that N=5 longitudinal lines will be added between each field line 201 (e.g., 15 feet/3 feet=5 lines).

As depicted in FIG. 3, to add N longitudinal lines to the grid model, the system first divides the calculated distance 205 in pixels by N-1 to calculate the pixel locations 303 where the longitudinal lines will intercept the top boundary of the video frame. Next, the system similarly divides the calculated distance 207 in pixels by N-1 to calculate the pixel locations 304 where the longitudinal lines will intercept the bottom boundary of the video frame. The system now has two distinct points for the expected locations of each longitudinal line in pixel space which it uses to construct the line. This line construction is done using standard geometry techniques such as using a polynomial fitting algorithm. At the conclusion of this step, the system produces a set of K longitudinal lines 305 for the given video frame as shown in FIG. 3. These longitudinal lines, although constructed in pixel space, inherit any field location information from the field lines 201 from the field model. For example, as depicted in FIG. 3 when the system constructs the longitudinal lines between the 20-yard field line and 25-yard field line it can assign the locations 21, 22, 23, and 24 to the four longitudinal field lines that it constructs and adds to the grid model. This location information will prove useful later for geolocating players on the field.

The present invention advances the art further by using the other standard field markings, namely hashmark and field numbers to now construct the needed latitudinal lines for completing the grid model. To utilize these field markings, the system must first be able to detect these field objects in real-time within the video. To enable this capability, the system employs deep learning to train a neural network model which can detect the hashmarks and field numbers on the field of play. As depicted in FIG. 4, thousands of images of football fields from different camera angles, lighting conditions, perspectives, etc. were obtained and the hashmark 401, 402 and field number markings 403 locations within the images were annotated by human experts. These annotations were then used to train a neural network and produce a generalized model which is then able to identify these same types of field objects 401, 402, 403 in otherwise unseen, unviewed, or unannotated video footage processed by the system.

With the ability to detect these field objects 401, 402, 403 within a video frame, the geometrical relationships of these objects to the predefined dimensions of the field lines 201, hashmarks 202, and sidelines 203 on the field of play are then utilized to construct latitudinal lines. Unfortunately, the key dimensions of the field of play in American football used for this construction vary depending on the level of competition (NFL, CFL, NCAA, high school, etc.) so the system must detect or be informed of the type of field the video was captured upon to account for these differences.

For example, as shown in FIG. 5 in a standard American football field (regardless of the level of competition), field lines 507, hashmarks 508, sidelines 509, and field numbers 510 are painted on the field of play. Every American football field has these field markings but their dimensions respective to each other on the field varies depending upon the league or level of competition. For example, the distance 501 from the sideline 509 to the nearest hashmark 508 differs between the NFL and NCAA level of competition. As depicted in table 511, which illustrates the current dimensions for the NFL and NCAA at the time of this writing, the distance 501 is 70.75 feet for an NFL field verses 60 feet for an NCAA field. Similarly, the distance 503 from the sideline 509 to the bottom of the nearest field number 510 is 36 feet for an NFL field whereas it is 21 feet for an NCAA field. So on and so forth. The system must account for these differences to properly construct the latitudinal lines added to the grid model.

In FIG. 5, 502 shows the distance between the hashmarks in the middle of the field of play. Reference numeral 503 shows the distance from the sideline to the bottom nearest field number on the field of play. Reference numeral 504 indicates the height of the field number painted on the field of play. Reference numeral 505 shows the width (excluding any flags present) of the field number painted on the field of play. The width of the hashmarks in the middle of the field of play is illustrated at 506.

The system can be informed of the field type when processing the input video via an input parameter or it can dynamically determine the field type using the proportional distances of field marking objects detected by its neural network model. For example, suppose the system detects F field number 403 objects, H hashmark 401 objects, and S sideline 402 objects using its neural network model. The system can choose a field line 201 that intercepts each of these 401, 402, 403 objects and calculate the pixel distances between these objects. Suppose the system determines the distance 503 from a detected sideline object 402 and the bottom of a field number object 403 is X pixels. Similarly, suppose the system determines the distance 501 from a sideline object 402 and nearest hashmark object 401 is Y pixels. The system can now calculate the ratio of X:Y and compare this to the ratios in a dictionary of known values for each league (NFL, NCAA) it supports. From table 511 in FIG. 5 we see the X:Y ratio (503 divided by 501) for an NFL field is 0.5088 (36 feet/70.75 feet) whereas the X:Y ratio for an NCAA field is 0.35 (21 feet/60 feet). Therefore, if the system's calculated ratio of X:Y is closer to 0.5088 this is very likely an NFL field whereas if it is closer to 0.35 this is very likely an NCAA field.

Once the system has determined the type of field, the system can use the locations of the identified field objects 501, 502, and 503 with the respective dimensions of the field as shown in FIG. 5 to calculate the interpolated latitudinal lines. To construct the latitudinal lines, the system first decides the level of granularity to use (herein referred to as the hashmark step size) for each latitudinal line. The system will frequently choose a hashmark step size of three feet (one yard) since this is a common measurement unit in American football.

Next the system constructs reference two latitudinal lines at the top edge of any detected field numbers 403 on both sides of the field. These "anchor" latitudinal lines are used by the system to assist in constructing the remaining latitudinal lines. As depicted in FIG. 6, the system uses the location of field number objects 603 detected by the neural network model to identify the region of the video frame where an anchor latitudinal line 604 should be located. As shown in the magnified view 605, the bounding box 607 for the detected field number object 603 provides a region of interest where the system uses image processing techniques to find the pixel location 606 within the video frame that corresponds of the top of the field number 603. Once this location 606 within the bounding box 607 is identified, the system uses basic geometry to construct an anchor line 604 parallel to the nearest hashmark 601 that intersects with a field line or a hashmark line that intercepts this location 606. This constructed latitudinal anchor line 604 now gives the system an important reference point within the input frame that it can use for calculating the remaining latitudinal lines.

At this point, the system constructs the latitudinal lines using a method similar to how it constructed the longitudinal lines. Referring to FIG. 7, the system uses the anchor latitudinal lines 704, hashmark lines 701, sidelines 702, and field number objects 703 identified by the neural network to construct the remaining latitudinal lines. The system utilizes the known distances from table 511 in combination with any combination of anchor latitudinal lines 704, hashmark lines 701, sidelines 702, and field number objects 703. In one aspect, the system may determine a distance between a first hashmark line and a second hashmark line, a first sideline and a second sideline, a first hashmark line and a first sideline, a first hashmark line and a first anchor line, a first anchor line and a second anchor line, or a first sideline and a first anchor line.

As an example, suppose the system has selected a hashmark step size of three feet (1 yard) and needs to generate the latitudinal lines between the hashmarks 701 in the middle of the field of play. Further, assume the system knows the video was captured on a standard NCAA field. Per the table 511 in FIG. 5, the distance in feet 502 between the two middle hashmarks is forty feet (13.3 yards). This means the system needs to generate N=13.3 latitudinal lines for the grid model.

To construct these latitudinal lines, the system first divides the calculated distance 707 in pixels by N−1 to calculate the pixel locations 705 where the latitudinal lines will intercept the left boundary of the video frame. Next, the system similarly divides the calculated distance 708 in pixels by N−1 to calculate the pixel locations 706 where the latitudinal lines will intercept the right boundary of the video frame. The system now has two distinct points for the expected locations of each latitudinal line in pixel space which it uses to construct the line. This line construction is done using standard geometry techniques such as using a polynomial fitting algorithm. At the conclusion of this step, the system produces a set of K latitudinal lines 709 for the given video frame as shown in FIG. 7. These latitudinal lines, although constructed in pixel space, inherit any field location information from the hashmark lines 701 from the field model. This location information will prove useful later for geolocating players on the field.

At this point, as depicted in FIG. 8 the system has generated a grid model that contains the full set of constructed longitudinal and latitudinal lines 805. The longitudinal and latitudinal lines 805 are drawn on the video frame in pixel space, but the dimensions are geometrically accurate to the actual locations on the field of play because the grid model was constructed using the predefined geometrical relationships of the field markings. The identification of field numbers 803 by the system's neural network model is key to determining the absolute locations of the longitudinal and latitudinal lines and producing an accurate x-y coordinate system for the actual field. As a result, once the final grid model is generated the system can now robustly reverse transform objects located within the video's 2D pixel space back into the original 3D location on the actual field (referred to as "grid space"). Put another way, the system can now convert pixel space to grid space.

These longitudinal and latitudinal lines in the grid model are kept in memory and reconstructed every N frames to account for camera panning and zooming. In some aspects, N=1. In other aspects, N is less than 1. This is an important consideration because the video quality varies based upon the camera equipment used, camera operator, lighting conditions, degree of camera panning and zooming, etc. so it is not sufficient to only construct the grid model once—it must be repeatedly reconstructed throughout video playback.

The present invention advances the art even further by offering a way to convert any arbitrary point in pixel space to an absolute location on the field of play. To perform the reverse transformation from 2D pixel space to coordinates on the actual field of play, refer to FIG. 9. A player 901 is identified in the input video using a neural network model using the method like that used for detecting field numbers.

The neural network model returns the bounding box (907) for the player 901 at which point the system then selects an anchor point 902 within this bounding box to reverse transform into a location in the field. Although the player is located within 3D space on the field, the system is only interested in the location of the player's feet on the field and so it selects an anchor point 902 which corresponds to this location, thereby setting Z=0 in the expected point in 3D space (X, Y, Z=0). This simplification allows the system to now perform a 2D pixel space to 2D grid space transformation. To perform this transformation, as depicted in the magnified view 904, the system uses the grid model to find the closest latitudinal line 905 and the closest longitudinal line 906. Once these lines 905, 906 are determined the system uses their known absolute field locations to calculate the actual x-y coordinates for this location on the field of play, thereby performing a 2D pixel space to 2D field of play transformation.

For example, referring to the player 1001 in FIG. 10 the anchor location 1002 is determined to be (875, 540) in pixel space. The system uses the grid model to find the closest latitudinal line 1005 to this location within the input frame and the closest longitudinal line 1006 to this location within the input frame. Using the grid model, the system determines the anchor location 1002 is located between the latitudinal line at location forty-five feet (15 yards) and latitudinal line at location forty-eight feet (16 yards); similarly, the system determines the anchor location 1002 is also located between the longitudinal line at location fifty-seven feet (19 yards) and the longitudinal line at location sixty feet (20 yards). Therefore, the system produces a final location 1003 on the field for this player 1001 as the x-y coordinate (29.5, 15.5) which is twenty-nine and a half yards from the nearest endzone and fifteen and a half yards from the nearest sideline. Since the system models the entire field as an x-y coordinate system of X=[0 . . . 100 yards] and Y=[0 . . . 53.3 yards] this generated x-y coordinate 1003 corresponds to an absolute location on the field of play. Manually inspecting the video by a human expert verifies this location is, in fact, correct.

At this point, as depicted in FIG. 11 the system has constructed a very high confidence grid model which it then uses to reverse transform all the identified players 1101 from pixel space to their actual locations 1102 on the field of play. This method results in the system producing a simulated Global Positioning System (GPS) for the field of play directly from the input video. Further, the system can execute this method on every frame of the input video to track players movement throughout the entirety of the game play. This geolocation does not require any sensors or assistive hardware—the tracking is done entirely from the video using the present invention. Moreover, this system has produced a model that independent of human error, subjectivity, and it accounts for the wide variations in the video quality. The system can overlay this high-quality grid model on to the original video for automating annotations, to assist with other video analytic processes, or as an aid to human experts that are manually annotating the video.

FIG. 12 illustrates a system 1200 configured for constructing a grid model within video and for converting an object in pixel space to an absolute location on a field of play, in accordance with one or more implementations. In some implementations, system 1200 may include one or more computing platforms 1202. Computing platform(s) 1202 may be configured to communicate with one or more remote platforms 1204 according to a client/server architecture, a peer-to-peer architecture, and/or other architectures. Remote platform(s) 1204 may be configured to communicate with other remote platforms via computing platform(s) 1202 and/or according to a client/server architecture, a peer-to-peer architecture, and/or other architectures. Users may access system 1200 via remote platform(s) 1204.

Computing platform(s) 1202 may be configured by machine-readable instructions 1206. Machine-readable instructions 1206 may include one or more instruction modules. The instruction modules may include computer program modules. The instruction modules may include one or more of set obtaining module 1208, model training module 1210, model storing module 1212, overlaying module 1214, field object detection module 1216, longitudinal lines construction module 1218, latitudinal lines construction module 1220, absolute location module 1222, boundary determining module 1224, distance determining module 1226, field type determining module 1228, annotating module 1230, outputting module 1234, and/or other instruction modules.

Set obtaining module 1208 may be configured to obtain sets of football video information. Individual ones of the sets of football video information may reflect gameplay. The football video information may include one or more frames of a football game or practice including still images, moving images, video, and may include digital or analog video. In some aspects, the football video information may be transformed in some manner prior to being obtained. Gameplay may include at least a portion of a football game or practice and may include images of players, field markings, lines, plays, objects, gear, and other items necessary for playing football. The video may include one or more frames from various angles, positions, locations, lighting, video speeds, games, or teams.

Model training module 1210 may be configured to train a machine-learning model, also known as a neural network or artificial intelligence model, with the obtained sets of football video information. In one aspect, the machine-learning model may be configured to identify one or more player within input video. Input video may refer to any previously unviewed, unseen, or unannotated video footage. The model may be configured to label one or more player by annotating the one or more player, marking the one or more player, or otherwise indicating the one or more player within one or more frame of input video. For example, the model may annotate a bounding box around at least a portion of a player within a frame of input video. During training of the machine-learning model, sample video from a plurality of different games, practices, and situations may be annotated by a human to identify players within the sample video.

In another aspect, model training module 1210 may train a plurality of machine-learning models. For example, in addition to the machine-learning model discussed above, the model training model 1210 may train a machine-learning model to identify one or more field object in one or more frame of input video. The one or more field object may include one or more hashmark and field number. Additionally, the model training module 1210 may train a machine-learning model to identify one or more field line, hashmark, hashmark line, or sideline in one or more frame of input video.

Model storing module 1212 may be configured to store at least one trained machine-learning model. The model may be stored in any location and in any type of storage media. The model may be encrypted prior to storage, during storage, and/or upon retrieval from storage. In some aspects, the model may be stored remotely, in other aspects, the model may be stored locally.

Overlaying module 1214 may be configured to overlay elements onto one or more frame of video. The video may include video input into the system that is unseen or unannotated and reflects at least one frame of football gameplay. The elements may include field lines, hashmarks, hashmark lines, sidelines, longitudinal lines, anchor lines, and latitudinal lines. The overlaying module 1214 may draw, annotate, illustrate, or output the elements onto one or more frame of video such that the elements may be viewable to a user.

Field object detection module 1216 may be configured to detect one or more field object in one or more frame of video. Field objects may include markings on the field surface. For example, field objects may include hashmarks or field numbers. The field object detection module 1216 may utilize a machine-learning model to identify or detect the one or more field object in the video.

Longitudinal lines construction module 1218 may be configured to construct lines aligned perpendicular to the length of the field. The longitudinal lines may be overlayed or presented in one or more frame of video. In one aspect, the longitudinal lines construction module 1218 may be configured to construct a plurality of evenly spaced longitudinal lines parallel to one or more field line. The constructed longitudinal lines may be overlayed onto one or more frame of video by the overlaying module 1214.

Latitudinal lines construction module 1220 may be configured to construct lines aligned parallel to the length of the field. The latitudinal lines may be overlayed or presented in one or more frame of video. In one aspect, the latitudinal lines construction module 1220 may be configured to construct one or more anchor line along a top portion of a field object detected by the field object detection module 1216. For example, one or more anchor line may be constructed along a top portion of a detected field object that has been annotated with a bounding box. In another aspect, the latitudinal lines construction module 1220 may be configured to construct a plurality of evenly spaced latitudinal lines. The plurality of evenly spaced latitudinal lines may be aligned parallel to one or more hashmark line or one or more anchor line.

Absolute location module 1222 may be configured to determine or assign an absolute location on a field of play for objects within one or more frame of video. In some aspects, the objects may include field markings, field objects, players, and other items located on a field of play. In some aspects, the absolute location module 1222 may be configured to assign a plurality of evenly spaced longitudinal lines, a plurality of evenly spaced longitudinal lines, one or more anchor line, one or more hashmark line, or one or more sideline, or one or more field line an absolute field location. In some aspects, the absolute location module 1222 may utilize assigned absolute values of a plurality of evenly spaced longitudinal lines, a plurality of evenly spaced longitudinal lines, one or more anchor line, one or more hashmark line, or one or more sideline, or one or more field line to determining an absolute location of an anchor point associated with a player. In some aspects, the anchor point may be associated with feet of a player.

Boundary determining module 1224 may be configured to calculate or determine the location for frame intercepts for one or more anchor line, one or more hashmark line, each of the plurality of latitudinal lines, and each of the plurality of longitudinal lines. Frame intercepts may refer to an upper intercept, a lower intercept, a left intercept, or a right intercept for the creation and positioning of one or more anchor line, one or more hashmark line, each of the plurality of latitudinal lines, and each of the plurality of longitudinal lines within a frame of video.

Distance determining module 1226 may be configured to determine a distance between frame intercepts. For example, the distance determining module 1226 may determine a distance between a first location where a first of the one or more field line intercepts a top boundary and a second location where a second of the one or more field lines intercepts a top boundary. Similarly, the distance determining module 1226 may determine a distance between a first location where a first anchor line intercepts a left boundary and a second location where a second anchor line intercepts the left boundary. These distances may be used to determine the spacing for a plurality of latitudinal or longitudinal lines forming a portion of a grid model.

Field type determining module 1228 may be configured to determine a type of playing field. The playing field may be one of a high school, college, NCAA, CFL, and NFL playing field. In one aspect. the field type determining module 1228 may be configured to receive an input that specifies the type of field. In other aspects, the field type determining module 1228 may use proportional distances of field objects to determine the type of field. The field objects may be detected using a neural network or machine-learning model.

Annotating module 1230 may be configured to annotate one or more frame of video. This may include labeling, drawing, illustrating, highlighting, or otherwise adding viewable information to the one or more frame of video. In some aspects, the annotating module 1230 may aid in the identification of a desired element. For example, the annotating module 1230 may provide bounding boxes for an identified player or field object. In other aspects, the annotating module 1230 may allow for direct input from a user. For example, a user may wish to include words describing a specific formation of an offense or defense.

Locating module 1232 may be configured to locate elements in a grid model. For example, locating module 1232 may locate a latitudinal line and a longitudinal line nearest a desired location. In one aspect, a desired location may include an anchor point that correlates to feet of a player.

Outputting module 1234 may be configured to output information to one or more presentation, display, or storage devices. The output information may include information derived from the various modules of or information input into system 1200. For example, the output information may include an annotation indicating the absolute locations of players in one or more frame of video.

In some implementations, computing platform(s) 1202, remote platform(s) 1204, and/or external resources 1226 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 1202, remote platform(s) 1204, and/or external resources 1226 may be operatively linked via some other communication media.

A given remote platform 1204 may include one or more processors configured to execute computer program modules. The computer program modules may be configured to enable an expert or user associated with the given remote platform 1204 to interface with system 1200 and/or external resources 1226, and/or provide other functionality attributed herein to remote platform(s) 1204. By way of non-limiting example, a given remote platform 1204 and/or a given computing platform 1202 may include one or more of a server, a desktop computer, a laptop computer, a handheld computer, a tablet computing platform, a Netbook, a Smartphone, a gaming console, supercomputer, quantum computer, and/or other computing platforms.

External resources 1226 may include sources of information outside of system 1200, external entities participating with system 1200, and/or other resources. In some implementations, some or all of the functionality attributed herein to external resources 1226 may be provided by resources included in system 1200.

Computing platform(s) 1202 may include electronic storage 1228, one or more processors 1230, and/or other components. Computing platform(s) 1202 may include communication lines, or ports to enable the exchange of information with a network and/or other computing platforms. Illustration of computing platform(s) 1202 in FIG. 12 is not intended to be limiting. Computing platform(s) 1202 may include a plurality of hardware, software, and/or firmware components operating together to provide the functionality attributed herein to computing platform(s) 1202. For example, computing platform(s) 1202 may be implemented by a cloud of computing platforms operating together as computing platform(s) 1202.

Electronic storage 1228 may comprise non-transitory storage media that electronically stores information. The electronic storage media of electronic storage 1228 may include one or both of system storage that is provided integrally (i.e., substantially non-removable) with computing platform(s) 1202 and/or removable storage that is removably connectable to computing platform(s) 1202 via, for example, a port (e.g., a USB port, a firewire port, etc.) or a drive (e.g., a disk drive, etc.). Electronic storage 1228 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 1228 may include one or more virtual storage resources (e.g., cloud storage, a virtual private network, and/or other virtual storage resources). Electronic storage 1228 may store software algorithms, information determined by processor(s) 1230, information received from computing platform(s) 1202, information received from remote platform(s) 1204, and/or other information that enables computing platform(s) 1202 to function as described herein.

Processor(s) 1230 may be configured to provide information processing capabilities in computing platform(s) 1202. As such, processor(s) 1230 may include one or more of a digital processor, an analog processor, a digital circuit designed to process information, an analog circuit designed to process information, a state machine, and/or other mechanisms for electronically processing information. Although processor(s) 1230 is shown in FIG. 12 as a single entity, this is for illustrative purposes only. In some implementations, processor(s) 1230 may include a plurality of processing units. These processing units may be physically located within the same device, or processor(s) 1230 may represent processing functionality of a plurality of devices operating in coordination. Processor(s) 1230 may be configured to execute modules 1208, 1210, 1212, 1214, 1216, 1218, 1220, 1222, 1224, 1226, 1228, 1230, 1232, and/or 1234, and/or other modules. Processor(s) 1230 may be configured to execute modules 1208, 1210, 1212, 1214, 1216, 1218, 1220, 1222, 1224, 1226, 1228, 1230, 1232, and/or 1234, and/or other modules by software; hardware; firmware; some combination of software, hardware, and/or firmware; and/or other mechanisms for configuring processing capabilities on processor(s) 1230. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 1208, 1210, 1212, 1214, 1216, 1218, 1220, 1222, 1224, 1226, 1228, 1230, 1232, and/or 1234 are illustrated in FIG. 12 as being implemented within a single processing unit, in implementations in which processor(s) 1230 includes multiple processing units, one or more of modules 1208, 1210, 1212, 1214, 1216, 1218, 1220, 1222, 1224, 1226, 1228, 1230, 1232, and/or 1234 may be implemented remotely from the other modules. The description of the functionality provided by the different modules 1208, 1210, 1212, 1214, 1216, 1218, 1220, 1222, 1224, 1226, 1228, 1230, 1232, and/or 1234 described below is for illustrative purposes, and is not intended to be limiting, as any of modules 1208, 1210, 1212, 1214, 1216, 1218, 1220, 1222, 1224, 1226, 1228, 1230, 1232, and/or 1234 may provide more or less functionality than is described. For example, one or more of modules 1208, 1210, 1212, 1214, 1216, 1218, 1220, 1222, 1224, 1226, 1228, 1230, 1232, and/or 1234 may be eliminated, and some or all of its functionality may be provided by other ones of modules 1208, 1210, 1212, 1214, 1216, 1218, 1220, 1222, 1224, 1226, 1228, 1230, 1232, and/or 1234. As another example, processor(s) 1230 may be configured to execute one or more additional modules that may perform some or all of the functionality attributed below to one of modules 1208, 1210, 1212, 1214, 1216, 1218, 1220, 1222, 1224, 1226, 1228, 1230, 1232, and/or 1234.

FIG. 13 illustrates a method 1300 for constructing a grid model within video, in accordance with one or more implementations. The operations of method 1300 presented below are intended to be illustrative. In some implementations, method 1300 may be accomplished with one or more additional operations not described, and/or without one or more of the operations discussed. Additionally, the order in which the operations of method 1300 are illustrated in FIG. 13, and described below is not intended to be limiting.

In some implementations, method 1300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all the operations of method 1300 in response to instructions stored electronically on an electronic storage medium. The one or more processing devices may include one or more devices configured through hardware, firmware, and/or software to be specifically designed for execution of one or more of the operations of method 1300.

An operation 1302 may include overlaying one or more field line, hashmark line, or sideline on one or more frame of video. The one or more frame of video may be video from a football game or practice and may reflect gameplay. The one or more field line, hashmark line, or sideline may be obtained from one or more neural network or machine-learning model that is configured to identify or construct field markings from input video. The one or more field line, hashmark line, or sideline may be viewable on the one or more frame of video and may be identifiable by one or more processor. Operation 1302 may be performed by one or more hardware processors configured by machine-readable instructions including a module that is the same as or similar to overlaying module 1214, in accordance with one or more implementations.

An operation 1304 may include constructing a plurality of evenly spaced longitudinal lines. The plurality of evenly spaced longitudinal lines may be parallel to one or more field line. Operation 1304 may be performed by one or more hardware processors configured by machine-readable instructions including a module that is the same as or similar to longitudinal lines construction module 1218, in accordance with one or more implementations.

An operation 1306 may include detecting one or more field object in one or more frame of video. Detecting the one or more field object may be performed using a neural network or machine-learning model. The neural network or machine-learning model may detect one or more field object including hashmarks or field numbers. The field objects may be annotated, for example by a bounding box. Operation 1306 may be performed by one or more hardware processors configured by machine-readable instructions including a module that is the same as or similar to field object detection module 1216, in accordance with one or more implementations.

An operation 1308 may include constructing one or more anchor line. The one or more anchor line may be constructed along a top portion of a detected field object. In one aspect, a detected field object may include a field number identified by a neural network or machine-learning model. Operation 1308 may be performed by one or more hardware processors configured by machine-readable instructions including a module that is the same as or similar to latitudinal lines construction module 1220, in accordance with one or more implementations.

An operation 1310 may include constructing a plurality of evenly spaced latitudinal lines. The evenly spaced latitudinal lines may be aligned parallel to one or more hashmark line, one or more sideline, or one or more anchor line. Operation 1310 may be performed by one or more hardware processors configured by machine-readable instructions including a module that is the same as or similar to latitudinal lines construction module 1220, in accordance with one or more implementations.

An operation 1312 may include overlaying the plurality of evenly spaced longitudinal lines, the one or more anchor line, or the plurality of evenly spaced latitudinal lines on the one or more fame of video. In some aspects, the plurality of evenly spaced longitudinal lines, the one or more anchor line, the plurality of evenly spaced latitudinal lines will all be overlayed on the one or more frame of video to form a complete grid model of the playing field. Operation 1312 may be performed by one or more hardware processors configured by machine-readable instructions including a module that is the same as or similar to overlaying module 1214, in accordance with one or more implementations.

FIG. 14A illustrates a method 1400 for converting an object in pixel space to an absolute location on a field of play, in accordance with one or more implementations.

An operation 1402 may include obtaining sets of football video information. The sets of football video information may reflect gameplay. Operation 1402 may be performed by one or more hardware processors configured by machine-readable instructions including a module that is the same as or similar to set obtaining module 1208, in accordance with one or more implementations.

An operation 1404 may include training a machine-learning model with the obtained sets of football video information such that the machine-learning model identifies one or more player within input video. Input video may include video that has been unviewed by the system and includes no annotations. Operation 4304 may be performed by one or more hardware processors configured by machine-readable instructions including a module that is the same as or similar to model training module 1210, in accordance with one or more implementations.

An operation 1406 may include storing the trained machine-learning model. Operation 1406 may be performed by one or more hardware processors configured by machine-readable instructions including a module that is the same as or similar to model storing module 1212, in accordance with one or more implementations FIG. 14B illustrates a method 1400 for converting an object in pixel space to an absolute location on a field of play, in accordance with one or more implementations. An operation 1408 may include annotating a bounding box around an identified player. In one aspect the bounding box may be generated by the neural-network or machine-learning model. Operation 1408 may be performed by one or more hardware processors configured by machine-readable instructions including a module that is the same as or similar to annotating module 1230, in accordance with one or more implementations.

An operation 1410 may include selecting an anchor point within a bounding box that has identified one or more player. In one aspect, the anchor point may correlate to a location of feet of an identified one or more player. In another aspect, the anchor point may correlate to a location of another portion of an identified one or more player. For example, the anchor point may correlate to a location of a player's helmet. Operation 1410 may be performed by one or more hardware processors configured by machine-readable instructions including a module that is the same as or similar to annotating module 1230, in accordance with one or more implementations.

An operation 1412 may include locating a latitudinal line and a longitudinal line of a grid model located nearest the anchor point. In one aspect, a grid model may include a plurality of latitudinal and longitudinal lines, and the system may identify and select the latitudinal line and the longitudinal line closest to a desired anchor point. In the grid model, each of the plurality of latitudinal and longitudinal lines may be associate with an absolute location on the field of play. Operation 1412 may be performed by one or more hardware processors configured by machine-readable instructions including a module that is the same as or similar to locating module 1232, in accordance with one or more implementations.

An operation 1414 may include determining an absolute location of the anchor point on the field of play. The system may interpretate an absolute location relative to the closest latitudinal and longitudinal lines. Operation 1414 may be performed by one or more hardware processors configured by machine-readable instructions including a module that is the same as or similar to the absolute location module 1222, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

While the present invention has been described in terms of particular embodiments and applications, in both summarized and detailed forms, it is not intended that these descriptions in any way limit its scope to any such embodiments and applications, and it will be understood that many substitutions, changes and variations in the described embodiments, applications and details of the method and system illustrated herein and of their operation can be made by those skilled in the art without departing from the spirit of this invention.

What is claimed is:

1. A system for constructing a grid model within video, comprising:
    one or more processors; and memory storing machine-readable instructions which, when executed by the one or more processors, cause the processors to:
    (i) receive one or more frames of video depicting an American football field of play;
    (ii) identify in one of the one or more frames, using a trained machine-learning model, hashmarks, field numbers, and key line intersection points formed where longitudinal field lines cross latitudinal hashmark lines;
    (iii) access a datastore containing league specific geometric field dimensions;
    (iv) in a two-dimensional pixel coordinate system of the one or more frames and without computing a transformation matrix, construct-using the key line intersection points and the league specific dimensions—
        (a) a plurality of evenly spaced longitudinal lines parallel to the detected longitudinal field line, and
        (b) a plurality of evenly spaced latitudinal lines parallel to the detected hashmark line, sideline, or anchor latitudinal line, thereby generating a grid model of the field of play using pixel-normalized ratios such that identical spacing is produced for any input resolution wherein pixel-normalized ratios comprise dividing all distances by frame height in pixels;
    (v) repeat step (iv) for each of the one or more frames of the video;
    (vi) overlay the grid model onto the respective frame; and
    (vii) determine an absolute two-dimensional field coordinate for at least one player anchor point in the frame by mapping the anchor point to the grid model and outputting the coordinate to persistent memory.

2. The system of claim 1, wherein the one or more field lines, hashmark lines, or sidelines are determined using the machine-learning model.

3. The system of claim 1, wherein the one or more field objects in step (ii) includes one or more hashmarks and one or more field numbers.

4. The system of claim 1, wherein the one or more processors are further configured by machine-readable instructions for:
    assigning to each of the plurality of evenly spaced longitudinal lines or to each of the plurality of evenly spaced latitudinal lines a respective absolute field location.

5. The system of claim 1, wherein the one or more processors are further configured by machine-readable instructions for:
    determining a left boundary and a right boundary for each of the plurality of evenly spaced longitudinal lines.

6. The system of claim 1, wherein constructing one or more anchor lines along a top portion of a detected field object includes annotating the detected field object with a bounding box.

7. A system for constructing a grid model within video, comprising: one or more processors and a memory storing machine-readable instructions which, when executed by the one or more processors, cause the processors to:
    (i) receive one or more frames of video depicting an American football field of play;
    (ii) identify in one of the one or more frames, using a trained machine-learning model, hashmarks, field numbers, and key line intersection points formed where longitudinal field lines cross latitudinal hashmark lines;
    (iii) determine, in a two-dimensional pixel coordinate system, a first pixel space distance between two reference field markings selected from: (a) two hashmark lines, (b) two sidelines, (c) a hashmark line and a sideline, (d) a hashmark line and an anchor latitudinal line derived from a top edge of a detected field number, (e) two anchor latitudinal lines each derived from a top edge of a detected field number, or (f) a sideline and an anchor latitudinal line derived from a top edge of a detected field number;
    (iv) divide the first pixel space distance by a number of intervals obtained from a league specific field dimension datastore to construct a plurality of evenly spaced latitudinal lines;
    (v) determine, for two adjacent longitudinal field lines detected in a frame of one or more frames, respective locations where the longitudinal field lines intercept a top boundary of the frame, compute a second pixel space distance between the locations, and divide the second distance equally to construct a plurality of interpolated longitudinal lines parallel to the longitudinal field lines, the latitudinal and longitudinal lines being generated without computing a transformation matrix, thereby generating a grid model in real-time;
    (vi) repeat step (iv) for each of the one or more frames of the video;
    (vii) overlay the grid model onto the one or more frames of video; and
    (viii) determine and output an absolute field coordinate for at least one player anchor point in the frame by mapping the anchor point to the grid model.

8. The system of claim 7, wherein the one or more processors are further configured by machine-readable instructions for:
    annotating the one or more frames of video with bounding boxes around the detected hashmarks and field numbers.

9. The system of claim 7, wherein the one or more processors are further configured by machine-readable instructions for:
    determining a type of field of play and selecting the number of intervals in step (iv) based on the type.

10. The system of claim 9, wherein determining a type of field includes: receiving an external input specifying the type of field.

11. The system of claim 9, wherein determining a type of field of play is inferred by comparing proportional distances between the detected field objects.

12. The system of claim 7, wherein the one or more processors are further configured by machine-readable instructions for: determining a location where the one or more field lines intercepts the top boundary of the one or more frames of video; and determining a location where the one or more field lines intercepts a bottom boundary of the one or more frames of video.

13. The system of claim 12, wherein constructing a plurality of evenly spaced longitudinal lines parallel to the one or more field lines includes: determining a distance between a first location where a first of the one or more field lines intercepts the top boundary of the one or more frames of video and a second location where a second of the one or more field lines intercepts the top boundary of the one or more frames of video; and dividing the second pixel-space distance to generate the plurality of interpolated longitudinal lines.

14. The system of claim 7, wherein the machine-learning model is trained by annotating field markings, field numbers, and hashmarks on sample frames of American football video.

* * * * *